(12) United States Patent
Obrebski et al.

(10) Patent No.: US 7,411,739 B2
(45) Date of Patent: Aug. 12, 2008

(54) IMAGING OPTICS WITH ADJUSTABLE OPTICAL POWER AND METHOD OF ADJUSTING AN OPTICAL POWER OF AN OPTICS

(75) Inventors: Andreas Obrebski, Steinwerth 35, Düsseldorf (DE) D-40489; Fritz Strahle, Heubach (DE)

(73) Assignee: Andreas Obrebski (DE)

( * ) Notice: Subject to any disclaimer, the term of this patent is extended or adjusted under 35 U.S.C. 154(b) by 0 days.

(21) Appl. No.: 11/408,633

(22) Filed: Apr. 21, 2006

(65) Prior Publication Data

US 2006/0256429 A1    Nov. 16, 2006

Related U.S. Application Data

(63) Continuation of application No. PCT/EP2004/012042, filed on Oct. 25, 2004.

(30) Foreign Application Priority Data

Oct. 23, 2003  (DE)  ................. 103 49 293
Jun. 1, 2004   (DE)  ................. 10 2004 026 580

(51) Int. Cl.
   G02B 1/06   (2006.01)
   G02B 3/12   (2006.01)
   G02B 21/22  (2006.01)
   G02F 1/13   (2006.01)

(52) U.S. Cl. ............... 359/666; 359/376; 349/200

(58) Field of Classification Search ........ 359/376, 359/377, 368, 666; 349/193, 200
See application file for complete search history.

(56) References Cited

U.S. PATENT DOCUMENTS 4,155,622 A    5/1979  Klein
4,190,330 A    2/1980  Berreman
4,572,616 A    2/1986  Kowel et al.
4,678,899 A    7/1987  Baba et al.
4,781,440 A    11/1988 Toda
4,795,248 A    1/1989  Okada et al.
4,820,028 A    4/1989  Suda et al.
4,909,626 A    3/1990  Purvis et al.
5,091,801 A    2/1992  Ebstein
5,143,435 A    9/1992  Kikuchi (Continued)

FOREIGN PATENT DOCUMENTS

DE   2439820       3/1976
DE   3546211 A1    7/1986
DE   9016892.5     3/1991
EP   0273568 A1    7/1988
JP   61-251818     11/1986

(Continued)

OTHER PUBLICATIONS

European Patent Office; Patent Abstracts of Japan; Publication No. 63060418; Publication Date Mar. 16, 1988 (1 page).

(Continued)

*Primary Examiner*—Alessandro Amari
(74) *Attorney, Agent, or Firm*—Osha Liang LLP

(57) ABSTRACT

The invention relates to optics comprising adjustable optical elements and, if desired, lenses of fixed focal lens. By use of an appropriate controller for the adjustable optical elements, characteristics of the optics can be advantageously varied. For this purpose, systems are provided which are suitable for use as surgical stereo-microscope, objective, ocular or zoom. A zoomable imaging optics comprises lenses and of variable optical power, which are oppositely controlled by means of a controller to change an imaging ratio, so that the optical power of the one lens is increased and the optical power of the other lens is decreased. Moreover, the imaging optics may comprise still further assemblies of fixed optical power.

52 Claims, 16 Drawing Sheets

U.S. PATENT DOCUMENTS

| | | | |
|---|---|---|---|
| 5,617,109 | A | 4/1997 | DeJule et al. |
| 5,701,196 | A | 12/1997 | Nakamura |
| 5,815,233 | A | 9/1998 | Morokawa et al. |
| 5,991,090 | A * | 11/1999 | Strahle ................ 359/660 |
| 6,081,372 | A | 6/2000 | Mura |
| 6,288,767 | B1 | 9/2001 | Murata et al. |
| 6,317,190 | B1 | 11/2001 | Winarski et al. |
| 6,891,679 | B2 * | 5/2005 | Atarashi et al. ......... 359/666 |
| 6,952,313 | B2 * | 10/2005 | Schrader ............... 359/666 |
| 2002/0055669 | A1 | 5/2002 | Konno |
| 2004/0114203 | A1 * | 6/2004 | Batchko ................ 359/3 |

FOREIGN PATENT DOCUMENTS

| | | |
|---|---|---|
| JP | 63-060418 | 3/1988 |
| WO | WO-01/02895 A1 | 1/2001 |
| WO | WO-01/02897 A1 | 1/2001 |
| WO | WO-02/057836 A1 | 7/2002 |
| WO | WO-02/095485 A2 | 11/2002 |
| WO | WO-03/032066 A1 | 4/2003 |
| WO | WO-2004/102253 A1 | 11/2004 |

OTHER PUBLICATIONS

European Patent Office; Patent Abstracts of Japan; Publication No. 61251818; Publication Date: Nov. 8, 1986 (1 page).

Varioptic: Technology, "How it works", http://www.varioptic.com/en/technologie.htm; "Variable focal lens KP45", http://www.varioptic.com/en/produit_kp45.htm (3 pages).

International Search Report dated Mar. 10, 2005; International Application No. PCT/EP2004/012042 (6 pages).

* cited by examiner

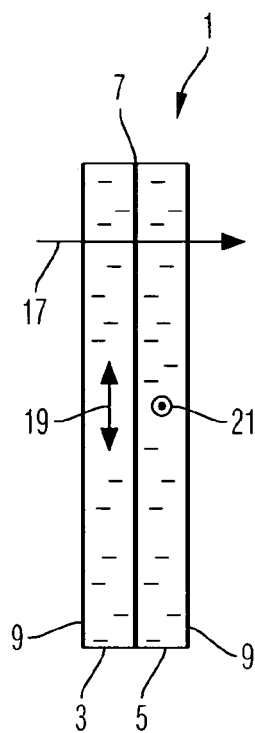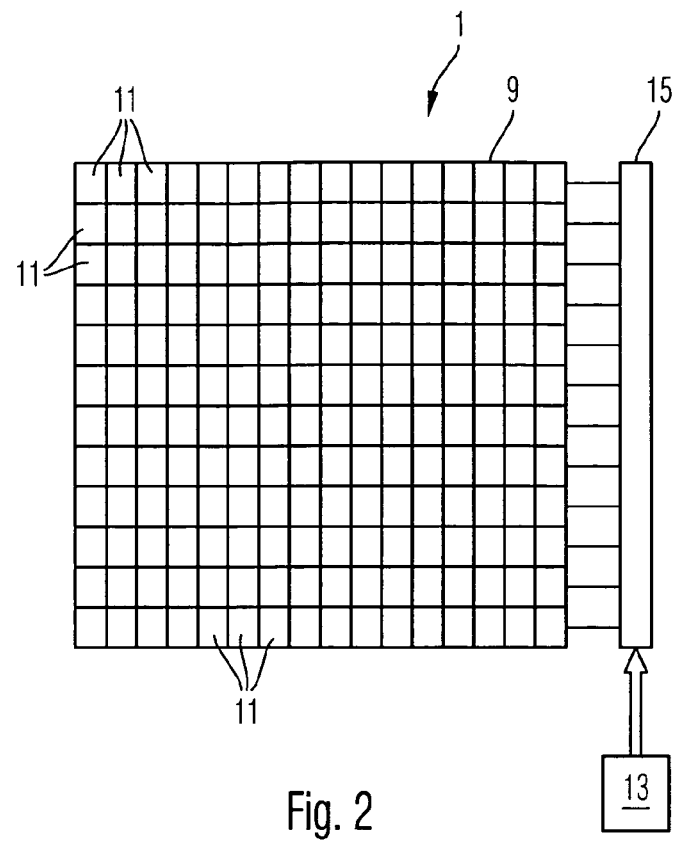
Fig. 1　　　　Fig. 2
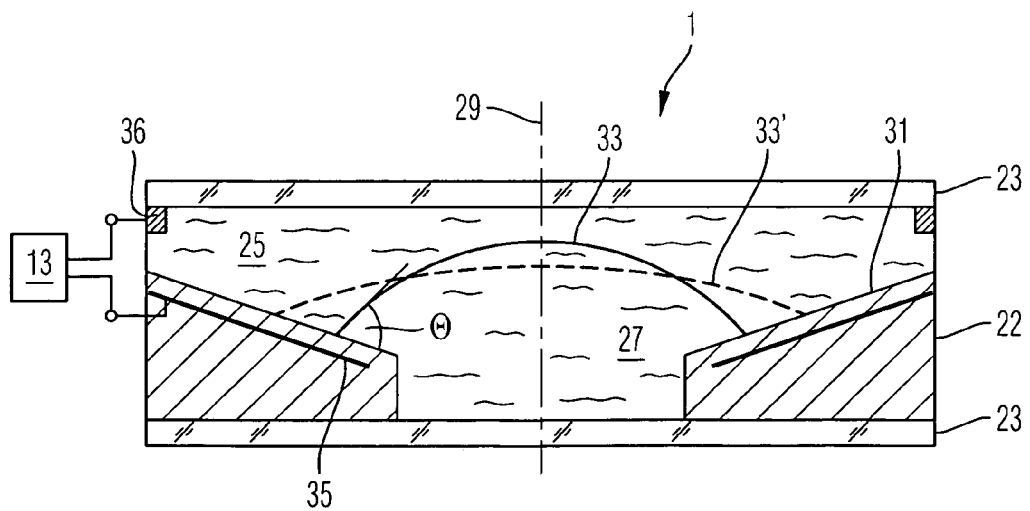
Fig. 3

IMAGING OPTICS WITH ADJUSTABLE OPTICAL POWER AND METHOD OF
ADJUSTING AN OPTICAL POWER OF AN
OPTICS

This application is a continuation application of PCT Application Number PCT/EP2004/012042, filed Oct. 25, 2004, which claims priority from German Patent Application No. 103 49 293.3 filed on Oct. 23, 2003 and German Patent Application No. 10 2004 026 580.1 filed on Jun. 1, 2004.

BACKGROUND OF INVENTION

1. Field of the Invention

The invention relates to imaging optics with adjustable optical power. The imaging optics is an optics of very general nature for use, for example, in a camera, telescope, a microscope or other optics. Furthermore, the invention relates to a method of adjusting an optical power in particular of a zoomable imaging optics.

Furthermore, the invention relates to a stereo-microscopy system for generating a magnified stereoscopic image of an object, as well as to a corresponding stereo-microscopy method.

A zoomable imaging optics is an imaging optics, the imaging ratio or magnification of which is variable.

2. Brief Description of Related Art

A conventional zoomable imaging optics comprises three lens assemblies, one of which is fixedly mounted in a support and the two other ones are displaceable along an optical axis of the optics to vary a magnification. In order to correctly displace these two lens assemblies relative to one another and relative to the fixedly positioned lens assembly, quite complex mechanics are required. Moreover, the necessary displacement of the lens assemblies requires the optics to have a relatively large minimum overall length.

From U.S. Pat. No. 4,820,028 a zoomable optics is known comprising a lens of variable optical power for changing the magnification, so that a mechanical displacement of lenses along the optical axis is not necessary. The lens of variable optical power forms part of an optics which, moreover, comprises plural lenses of fixed optical power and enables a relatively good compensation of imaging aberrations at a specific setting of the lens of variable optical power. However, if the optical power of the lens of variable optical power is varied to change the magnification, imaging aberrations occur which have a disturbing effect.

A conventional stereo-microscopy system comprises a left-hand stereo optics for generating a left-hand partial image of the stereoscopic image, as well as a right-hand partial stereo optics for generating a right-hand partial image of the stereoscopic image.

U.S. Pat. No. 6,081,372, for example, discloses a stereo-microscopy system of the so-called "Grenough" type, wherein each one of the left-hand partial stereo optics and the right-hand partial stereo optics comprises a separate objective assembly. Principal axes of both partial stereo optics are oriented at an angle relative to one another such that they intersect in an object plane of the two objective assemblies. If, in such a stereo-microscopy system, a working distance between the object plane and the objective assemblies is to be changed, the angle between the two principal axes must be changed accordingly, which renders the required mechanics unreasonably complex under practical aspects.

DE 90 16 892 U1 and U.S. Pat. No. 5,701,196 disclose stereo-microscopy systems, wherein an objective is provided for transforming an object-side beam bundle, emanating from an object plane of the objective, into an image-side beam bundle, and wherein left-hand partial stereo optics and right-hand partial stereo optics are provided in the respective image-side beam bundle and extract therefrom a left-hand partial beam bundle and a right-hand partial beam bundle, respectively, to generate therefrom the left-hand partial image and the right-hand partial image, respectively, of the stereoscopic image. The principal axes of the two partial beam bundles of the left-hand and right-hand partial stereo optics are fixedly positioned spaced apart from another and traverse the common objective also spaced apart from each other. The objective provides an optical power of a round lens. The objective comprises at least one assembly of positive optical power and one assembly of negative optical power, a distance between the two assemblies being variable to change a working distance between the objective and an object plane of the objective. In contrast to the stereo-microscopy system known from U.S. Pat. No. 6,081,372, no angle need to be changed between the principal axes of the two partial stereo optics in order to change a working distance.

The stereo-microscopy systems known from DE 90 16 892 U1 and U.S. Pat. No. 5,701,196 have proved successful in practice as far as the change of the working distance is concerned, but exhibit different optical characteristics, as against a comparable stereo-microscope with fixed working distance, i.e., wherein the working distance is not changeable. For example, in the stereo-microscopy system known from DE 90 16 892 U1, the assembly having a negative optical power is disposed closer to the object plane than the assembly having a positive optical power. Consequently, a principal plane of the objective is disposed, viewed from the object plane of the objective, behind the objective. Accordingly, a focal length of the objective is longer than a working distance between objective and objective plane. Due to the, as compared to the working distance, long focal length, the objective exhibits a total magnification, stereo impression and resolution which are diminished as compared to the corresponding objective with fixed focal length in which the focal length corresponds about to the working distance.

In the stereo-microscopy system known from U.S. Pat. No. 5,701,196, the assembly of positive optical power is disposed closer to the object plane than the lens assembly of negative optical power. As a result, a principal axis of the objective is disposed between the objective and the object plane. Accordingly, a focal length of the objective is shorter than a working distance between the object plane and the objective as such. This causes a decrease in the object field diameter and the depth of field as well as in an increase in the overall length, the overall volume and weight as compared to a corresponding objective with fixed focal length.

SUMMARY OF THE INVENTION

The present invention has been accomplished taking the above problems into consideration.

It is an object of the present invention to provide a zoomable imaging optics, wherein the required optical imaging quality is appropriately achieved by use of a lens of variable optical power.

Furthermore, it is an object of the invention to provide a method of controlling an imaging optics with variable magnification.

Furthermore, it is an object of the invention to provide imaging optics which can be easily equipped with a zoom function.

A further object of the present invention is to provide a stereo-microscopy system with variable optical properties, such as a variable working distance, which stereo-microscopy system is comparable, as far as its optical qualities and/or its overall volume and weight are concerned, with a corresponding microscopy system with fixed working distance.

According to one aspect of the invention, a zoomable imaging optics is provided which comprises at least two lenses of variable optical power disposed spaced apart from one another along a common optical axis. In order to change the imaging ratio and magnification, respectively, provided by the imaging optics, the two lenses of variable optical power are controlled oppositely, i.e., in counter direction, that is, a first one of the two lenses is controlled to increase the optical power provided by said lens, while a second one of the two lenses of variable optical power is controlled to decrease the optical power provided by the same, and vice versa.

The zoomable imaging optics may constitute a part of a larger optical system which, moreover, comprises, for example, an ocular or/and image detector or/and an objective and other optical components.

According to an exemplary embodiment, the zoomable imaging optics comprises merely the two lenses of variable optical power and no further lenses of fixed optical power.

According to a further exemplary embodiment, the zoomable imaging optics comprises at least one further lens of fixed optical power. According to this exemplary embodiment, the lens of fixed optical power is not disposed between the two lenses of variable optical power. According to an alternative exemplary embodiment, the at least one lens of fixed optical power is disposed between the two lenses of variable optical power.

An optical axis is assignable to each one of the lenses of variable optical power, so that the action of the lens of variable optical power is that of a round lens so that, moreover, a focal length is assignable to this round lens action, said focal length being variable by varying the optical power of the lens. However, this does not exclude that the lens also provides a variable optical power which is not rotationally symmetric in respect of the optical axis. Moreover, this does not exclude either that the lens of variable optical power is controllable such that the optical axis, to which the round lens action is assignable, is variable in respect of its spatial position, for example, as far as its orientation or a lateral displacement are concerned.

Due to the two lenses of variable optical power being oppositely controlled, a desired zoom effect is achievable, that is, a change in the imaging ratio. Moreover, the opposite control causes at least a partial compensation of image aberrations. An example for this is a chromatic aberration.

According to an exemplary embodiment, the zoomable imaging optics comprises at least a partial imaging optics with at least one lens of fixed optical power which may be selectively disposed in and removed from one of the beam paths traversing the two lenses of variable optical power. This allows to enlarge a range in which the imaging ratio of the imaging optics is variable. By correspondingly controlling the lenses of variable optical power, it is possible to change substantially continuously the imaging ratio over a specific range. By positioning the partial imaging optics in the beam path and by removing the same from the beam path, respectively, it is then possible, in addition, to stepwise increase and decrease the imaging ratio, respectively. According to an exemplary embodiment, the removal and insertion, respectively, of the partial imaging optics enables the imaging ratio to be changed by at least 30%.

According to a further exemplary embodiment, the partial imaging optics itself exhibits a telescopic construction, for example, that of a Galilean telescope or Keplerian telescope.

According to an exemplary embodiment, in order to fold the beam path, at least one mirror is disposed in the beam path between the two lenses of variable optical power. This enables to realize zoomable imaging optics which exhibit a particularly short overall length. As the zoomable imaging optics includes no optical components which are displaceable along the optical axis, an optical path length between successive foldings of the beam path may be particularly short and, by plural folding of the beam path, a particularly compact zoomable imaging optics is achievable.

According to a further aspect of the invention, a family of imaging optics is provided, comprising at least two imaging optics, one of which does not comprise lenses of variable optical power, the other one comprising at least two lenses of variable optical power disposed spaced apart from one another in the beam path. These second imaging optics is thus zoomable by controlling the lenses of variable optical power. The two imaging optics have specific features in common, such as, for example, geometric properties. This includes, for example, the radii of curvature and diameter of the lens surfaces and vertex distances of the lens surfaces. This allows to cost-efficiently provide a product family of optical devices which include common optical components so that the manufacture of these optical components and the assembly of the devices is rendered cost-efficiently as well. One member of the family then exhibits the zoom function due to the lenses of variable optical power, while another member of the family does not exhibit this property, but is available at lower cost.

This aspect of the invention is based on the finding of the inventors that even existing designs of imaging optics may offer a direct basis for a design of an imaging optics which is rendered zoomable by two lenses of variable optical power. In this respect, an existing design of an imaging optics can be taken as a basis which is supplemented in that two lenses of variable optical power are inserted spaced apart from each other into this existing design. If these two lenses of variable optical power are then oppositely controlled, a change in the imaging ratio provided by the optics is achieved.

According to a further aspect of the invention, a microscope with variable magnification is provided, comprising an objective for transforming an object-side beam bundle, emanating from an object plane of the objective, into an image-side beam bundle, and an image-forming assembly. The image-forming assembly may be, for example, an ocular through which the operator of the microscope views in order to directly observe optically an object disposed in the object plane. The image-forming assembly may also comprise an image detector, such as a camera, for taking an electronic image of the object.

Two lenses of variable optical power are disposed in an imaging beam path of the microscope between the object plane and the image-forming assembly, said lenses being oppositely controllable for varying the imaging ratio of the microscope, as explained above.

According to an exemplary embodiment, the two lenses of variable optical power are disposed in the objective.

According to a further exemplary embodiment, the two lenses of variable optical power are disposed in the beam path between the objective and the image-forming assembly.

According to a further exemplary embodiment, an optical assembly is provided which is selectively insertable in and removable from the beam path in order to change the imaging ratio stepwise.

According to an exemplary embodiment, the partial optics is pivotable about an axis which is oriented transversely to a direction of the beam path in order to move the partial optics into or out of the beam path.

According to a first aspect of the invention, a stereo-microscopy system is provided, comprising a left-hand partial stereo optics and a right-hand partial stereo optics for generating a left-hand partial image and a right-hand partial image, respectively, of the stereoscopic image. The stereo-microscopy system, moreover, comprises an objective commonly traversed by the left-hand and right-hand partial beam bundles of the left-hand partial stereo optics and the right-hand partial stereo optics, respectively.

The objective comprises a lens assembly of a first lens of positive optical power and a second lens of negative optical power, the indices of refraction of the lens materials of the two lenses being different from each other in order to achieve a correction of specific aberrations, such as, chromatic longitudinal aberrations and spherical aberrations. To this end, the lens assembly can be in the form of a cemented element.

The lens assembly, furthermore, comprises a third lens of variable optical power. The first, second and third lenses are disposed spaced apart from one another along the optical axis at fixed distances from one another. A focal length of the first lens and the second lens together, that is, without the third lens or, in the case that the third lens as such does not provide any optical power, is in a range between 150 mm and 450 mm. The optical power of the third lens is variable such that a working distance between the object plane of the objective and one of the first, second or third lenses of the objective is variable at least in a range of from 200 mm to 400 mm.

This allows to vary the working distance of the stereo-microscopy system, without having to displace lenses of the objective relative to one another along the optical axis of the objective.

Lenses with adjustable and variable optical power are known per se from the prior art, for example, from U.S. Pat. No. 4,795,248 or U.S. Pat. No. 5,815,233. Such lenses of adjustable optical power comprise a liquid crystal layer which is controllable via an electrode structure in order to selectively adjust an optical path length through the liquid crystal layer for a beam traversing said layer spatially dependently, that is, via a cross-section of the lens. As a result, a flexible lens action is provided. However, so far, it has not been achieved to successfully integrate such flexible lenses of adjustable optical power into a stereo-microscopy system. According to the configuration provided by the invention, however, a stereo-microscopy system with an objective is provided having a working distance which is substantially equal to the focal length of the objective.

Accordingly, the disadvantages described above in respect of the objectives, wherein the working distance differs considerably from the focal length, are reduced and advantageous properties regarding, for example, total magnification, stereo impression, resolution, overall length and weight, are achieved.

According to a further aspect of the invention, a stereo-microscopy system is provided which, again, comprises a left-hand partial stereo optics and a right-hand partial stereo optics and a common objective. Each one of the two partial stereo optics comprises a zoom optics. The two zoom optics are preferably of identical structure. However, the structure of the zoom optics of the left-hand partial stereo optics may differ from the structure of the zoom optics of the right-hand partial stereo optics. However, the structure of the two zoom partial stereo optics are similar in functional respect in that each one comprises two lens assemblies disposed spaced apart from one another. Each one of the two lens assemblies comprises a first lens of positive optical power and a second lens of negative optical power, as well as a third lens of adjustable optical power. The first, second and third lenses of each lens assembly are fixedly disposed relative to one another along a principal axis of the zoom optics, and the two lens assemblies are disposed spaced apart from each other by a fixed distance along the principal axis as well. This configuration enables to provide a variable magnification of the stereo-microscopy system, without having to displace lens assemblies of the zoom optics along the principal axis of the zoom optics, as it was so far usual in prior art.

According to one embodiment, the third lens of the one lens assembly is controlled to increase the optical power of said lens, and the third lens of the other lens assembly is controlled to decrease the optical power of said lens in order to change the magnification provided by the zoom optics.

According to a further embodiment, a stereo-microscopy system is provided comprising a left-hand partial stereo optics and a right-hand partial stereo optics. Each one of the left-hand and right-hand partial stereo optics comprises an ocular with a first lens of positive optical power, a second lens of negative optical power and a third lens of variable optical power, the distances between said lenses along an optical axis of the ocular being fixed. The optical power of the third lens is adjustable in order to compensate defects of the eye of the operator of the stereo-microscopy system who views through the ocular. This allows to compensate vision defects of the eye viewing through the ocular, without components of the ocular or the ocular as a whole having to be displaced. In particular, the third lens of adjustable optical power may provide a cylinder action, so that a simple way is achieved as well of compensating an astigmatism of the eye viewing through the ocular.

According to one embodiment, a controller for controlling the third lens comprises a memory for storing values representative of the vision defects of the eyes of different users. The oculars of the stereo-microscopy system are then selectively controlled to compensate for the vision defects of one or more users. Preferably, the controller comprises a user interface which allows the respective user to select the ocular setting allocated to the respective user and to change settings in order to compensate his vision defects. The user interface may be in the form of a keyboard, a selection switch, a language control or the like.

According to a further embodiment, a stereo-microscopy system is provided, comprising a left-hand partial stereo optics and a right-hand stereo optics, each one of the two partial stereo optics comprising a separate objective. A working distance between the objectives and the object planes thereof is variable, and at least one of the two objectives comprises a wedge prism exhibiting an adjustable wedge prism action so that, even if the working distances are changed, precise stereoscopic partial images can be obtained via the left-hand and right-hand partial stereo optics, without principal axes of the partial stereo optics having to be mechanically changed as far as their orientation relative to one another is concerned.

According to a further embodiment, a stereo-microscopy system is provided, comprising a left-hand partial stereo optics and a right-hand partial stereo optics and a common objective. The common objective includes a lens of positive optical power and an optical assembly whose optical path length provided for the beams traversing said assembly is variable spatially dependently such that on each of the principal axes of the left-hand and right-hand partial stereo optics a round lens action is provided. This assembly of the objective thus provides for both partial stereo optics separate optical effects, so that said assembly of the objective may provide functions which are conventionally provided by the two partial stereo optics themselves.

In this respect, it is in particular possible to displace in simple manner the round lens action provided for the two partial stereo optics in circumferential direction about a principal axis of the objective. Accordingly, as compared to conventional solutions, the number of components of the partial stereo optics which must be displaced when the partial stereo optics are rotated in circumferential direction about the principal axis of the objective is reduced.

In particular, it is then also possible to provide simplified zoom systems in the partial stereo optics in that, when a magnification provided by the zoom systems is changed, the intensity of the round lens action can be changed as well.

BRIEF DESCRIPTION OF THE DRAWINGS

The foregoing as well as other advantageous features of the invention will be more apparent from the following detailed description of exemplary embodiments of the invention with reference to the accompanying drawings. It is noted that not all possible embodiments of the present invention necessarily exhibit each and every, or any, of the advantages identified herein.

FIG. 1 shows a cross-section through a lens of variable optical power for use in embodiments of the invention, FIG. 2 is a detailed top-plan view of the lens of variable optical power shown in FIG. 1, FIG. 3 shows a cross-section of a lens of variable optical power for use in embodiments of the invention.

DETAILED DESCRIPTION OF EXEMPLARY EMBODIMENTS

Figure 4:
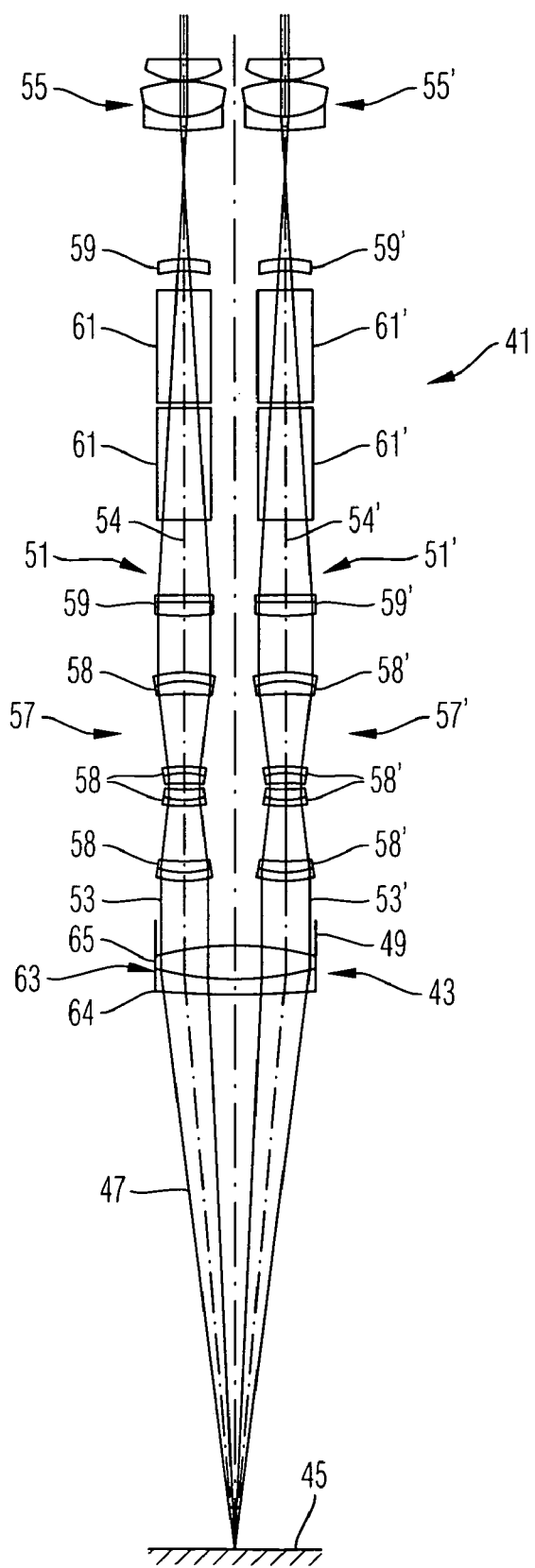
FIG. 4 shows a stereo-microscopy system as an example of a total optics which may comprise a zoomable imaging optics according to the invention.

In the exemplary embodiments described below, components that are alike in function and structure are designated as far as possible by alike reference numerals. Therefore, to understand the features of the individual components of a specific embodiment, the descriptions of other embodiments and of the summary of the invention should be referred to.

Embodiments of the imaging optics according to the invention will now be described in further detail which include lenses of variable optical power. First of all, an embodiment of such a lens of variable optical power will be described below with reference to FIGS. 1 and 2. Such lenses are known, for example, from U.S. Pat. No. 4,795,248, U.S. Pat. No. 6,317,190 B1, U.S. Pat. No. 5,617,109, U.S. Pat. No. 4,909,626, U.S. Pat. No. 4,781,440, U.S. Pat. No. 4,190,330, U.S. Pat. No. 4,572,616 and U.S. Pat. No. 5,815,233, the full disclosures of which are incorporated herein by reference.

FIG. 1 shows a cross-section through a lens 1 of variable optical power. Lens 1 comprises a first liquid crystal layer 3 and a second liquid crystal layer 5, each being provided on one side of a common transparent continuous electrode 7. A further transparent electrode structure 9, as shown in plan view in FIG. 2, is disposed on a side of the liquid crystal layer 3 opposite to the common electrode 7. The electrode structure 9 provides a plurality of controllable pixels 11 which are arranged in a rectangular grid. A controller 13 is provided to apply an adjustable voltage to each pixel 11 via a driver 15 which supplies the voltage to the individual pixels, as it is commonly known for liquid crystal displays. Accordingly, an electrical field between a respective pixel 11 and the common electrode is adjustable and, depending on how the electric field is set, the liquid crystal layer 3 provides a variable optical path length for a light beam to traverse said liquid crystal layer in a polarization direction of the beam 17. A further transparent electrode structure 9, configured as shown in FIG. 2, is disposed on a side of the liquid crystal layer 5 facing away from the common electrode 7, said electrode structure 9 being likewise controlled by the controller 13. While the liquid crystal layer 3 provides the variable optical path length in a polarization direction in the plane of FIG. 1, as intimated by an arrow 19, the liquid crystal layer 5 provides a corresponding variable optical path length in a polarization direction orthogonal to the aforesaid polarization direction, as indicated by symbol 21 in FIG. 1.

By appropriately controlling the electrode structure 9, it is thus possible to provide for both polarization directions of the beam 17 optical path lengths of the two liquid crystal layers 3, 5, said path lengths being adjustable as a function of a position on the layers 3, 5. Accordingly, lens 1 as a whole can be controlled to provide adjustable optical effects for the beam 17, such as a round lens action of positive optical power or negative optical power in respect of a selectable optical axis, a cylinder lens action of positive optical power or negative optical power in respect of an adjustable plane of symmetry, a wedge prism action of adjustable power, but also actions which correspond to more complex optical elements.

FIG. 3 shows a cross-section through a further lens 1 of variable optical power. Lens 1 comprises a housing 21 with two entrance and exit windows 23, respectively, which enclose two liquids 25 and 27 which have a different index of refraction and, preferably, are substantially not miscible with each other. One of the liquids 25 is, for example, water or an aqueous saline solution. The other liquid 27 is, for example, an oil. The housing 22 provides a conical wall 31 for the two liquids 25, 27 which is symmetrical in respect of an optical axis 29 of the assembly and which contacts an interface 33 between the two liquids at an angle of contact θ. A likewise conical electrode 35 is disposed within the wall 31, and an annular electrode 36 is disposed in the volume of liquid 25 near the window 23. The liquid 25 is electrically conducting, while liquid 27 is substantially electrically non-conducting. A voltage between the electrodes 35 and 36 is adjustable by a controller 13. A change in the voltage between the electrodes 35 and 36 changes the angle θ which the interface 33 between the two liquids 25, 27 encloses with the wall 31. By varying the voltage between the electrodes 35, 36, it is thus possible to change the shape and curvature of the interface 33, as it is schematically represented by the dashed line 33' in FIG. 3. Due to the different indices of refraction of the two liquids 25, 27, a lens action which lens 1 imparts on a beam traversing said lens along the optical axis 29 is variable.

A lens of the type shown in FIG. 3 can be obtained, for example, from the company Varioptic, 69007 Lyon, France.

Further lenses of variable optical power, which make use of a change in the shape of an interface for varying the optical power, are known from U.S. Pat. No. 6,369,954, CA 2,368,553 and U.S. Pat. No. 4,783,155, the full disclosures of which are incorporated herein by reference.

The principles of the present invention are applicable to arbitrary imaging optics, such as, for example, film cameras, photo cameras, telescopes, measuring optics or microscopes. As an example, a stereo-microscope will be described hereinbelow.

FIG. 4 schematically shows a conventional stereo-microscopy system 41, comprising an objective 43 for transforming an object-side beam bundle 47, emanating from an object plane 45, into an image-side beam bundle 49. The stereo-microscopy system 41 further comprises a left-hand partial optics 51 and a right-hand partial optics 51', each of which extracts a partial beam bundle 53 and 53', respectively, from the image-side beam bundle 49 and feeds the same to oculars 55 and 55', respectively, as image-forming assemblies of the stereo-microscopy system 41. To this end, each one of the left-hand and the right-hand partial stereo optics 51, 51' comprises a zoom system 57 and 57', respectively, consisting of plural lens groups 58, 58', a tube with lens assemblies 59, 59' and reflecting prisms 61, 61', the beam path folded by the reflecting prisms 61, 61' being shown unfolded in FIG. 4.

The objective 43 comprises a lens assembly 63 of a lens 64 of negative optical power, said lens being the lens of the objective 43 which faces the object plane 45. Furthermore, the lens assembly 63 comprises a lens 65 of positive optical power which is cemented with the lens 64.

Figure 5:
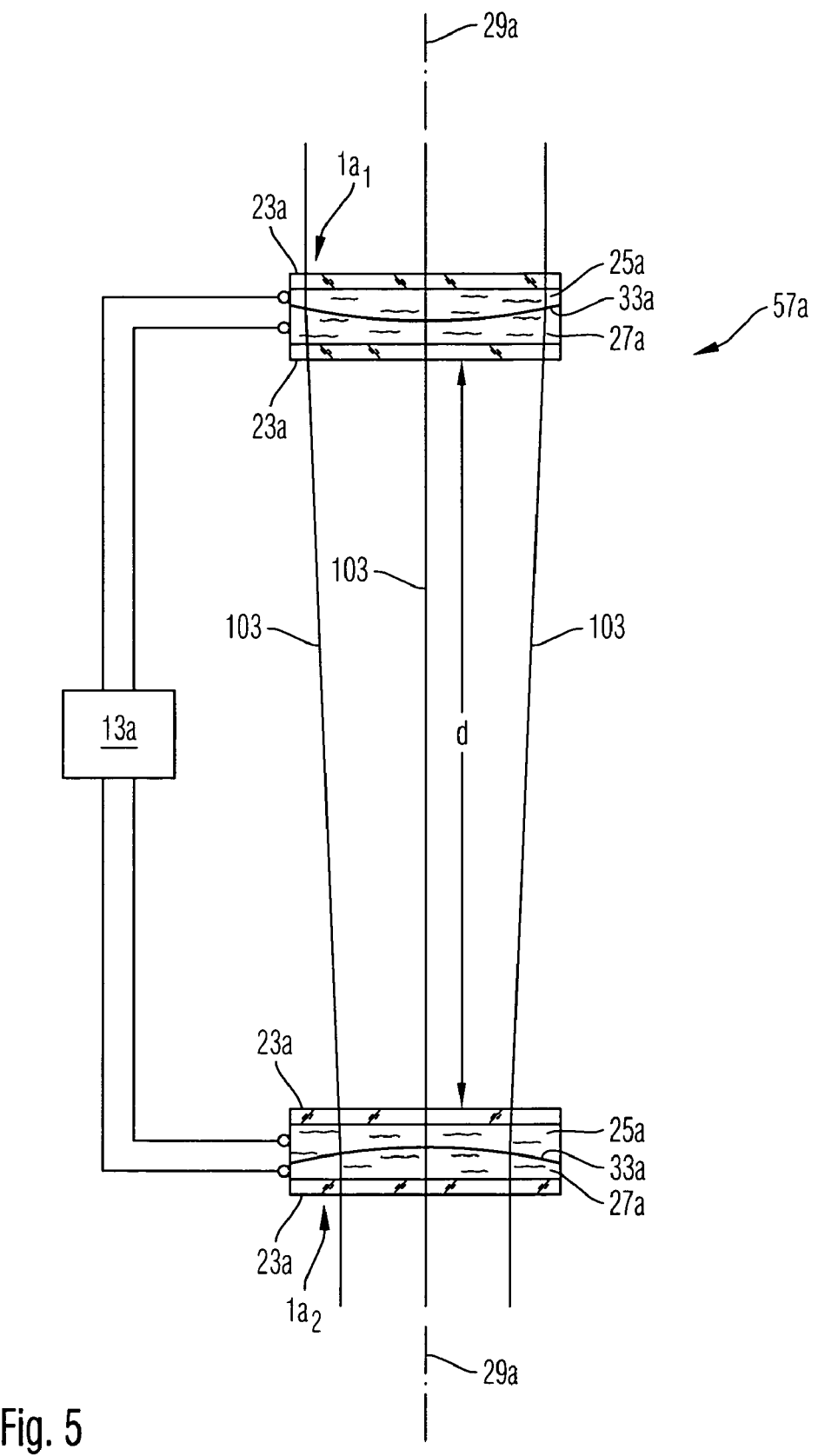
FIG. 5 shows an embodiment of a zoomable imaging optics comprising only two lenses of variable optical power.

FIG. 5 shows an example of a zoomable imaging optics 57a consisting merely of two lenses $1a_1$ and $1a_2$ of variable optical power which are disposed along a common optical axis spaced apart from one another by a distance d=28.8 mm. Each one of the two lenses $1a_1$, $1a_2$ of variable optical power is of the type as described with reference to FIG. 3, that is, each one of the two lenses $1a_1$ and $1a_2$ comprises an interface 33a between two liquids 25a and 27a which have different indices of refraction and are enclosed in a space between windows 23a. A controller 13a is provided to appropriately apply control voltages to the lenses $1a_1$ and $1a_2$ for adjusting a radius of curvature of the interfaces 33a.

The following Table 1 indicates three settings of the lenses $1a_1$ and $1a_2$ with focal lengths $f_1$ and $f_2$ caused by the controller 13a.

TABLE 1

| Setting No. | Magnification | Lens $1a_1$ $1/f_1$ [dptr] | Lens $1a_2$ $1/f_2$ [dptr] |
|---|---|---|---|
| 1 | 1.0 | 0 | 0 |
| 2 | 1.25 | 6.5 | −8.1 |
| 3 | 0.80 | −8.1 | 6.5 |

The setting No. 3 is shown in FIG. 5, the beams passing through lenses $1a_1$ and $1a_2$ being designated by reference number 103.

This imaging optics thus operates like a Galilean telescope and has an afocal beam path on the entrance and exit sides. Both lenses $1a_1$ and $1a_2$ are oppositely controlled by the controller 13a, that is, proceeding from a magnification of 1.0× at which both lenses have an optical power of 0 dptr, the optical power of lens $1a_1$ is increased and the optical power of lens $1a_2$ is decreased in order to increase the magnification.

The curvature of the interface 33a between the two media 25a and 27a causes, apart from the optical power indicated in Table 1 which is indicated for a wave length of 546 nm in dptr, also a chromatic longitudinal aberration which is not negligible and is indicated in the following Table 2 in dptr (dioptre) for each one of the lenses $1a_1$ and $1a_2$ and for the total imaging optics 57a as optical power difference between blue light at 480 nm and red light at 644 nm:

TABLE 2

| Setting No. | Magnification | Lens $1a_1$ | Lens $1a_2$ | Total optics 57a |
|---|---|---|---|---|
| 1 | 1.0 | 0 | 0 | 0 |
| 2 | 1.25 | −0.3 | 0.3 | −0.07 |
| 3 | 0.80 | 0.2 | −0.2 | −0.04 |

It is evident from Table 2 that each one of the lenses $1a_1$ and $1a_2$ causes a considerable chromatic longitudinal aberration, but that the chromatic longitudinal aberration of the total optics 57a is considerably smaller than the chromatic longitudinal aberrations of the individual lenses. This is attributable to the fact that, due to the lenses $1a_1$ and $1a_2$ being oppositely controlled, their chromatic longitudinal aberrations are largely compensated in the zoom system 57a as a whole.

The zoom system 57a may replace the zoom systems 57 and 57' of the conventional microscopy system described with reference to FIG. 4, so that the microscopy system provides a variable magnification, without optical components having to be mechanically displaced for this purpose. Equally, it is possible to integrate the zoom system 57a in any other optical system, such as, for example, a telescope.

Figure 6:
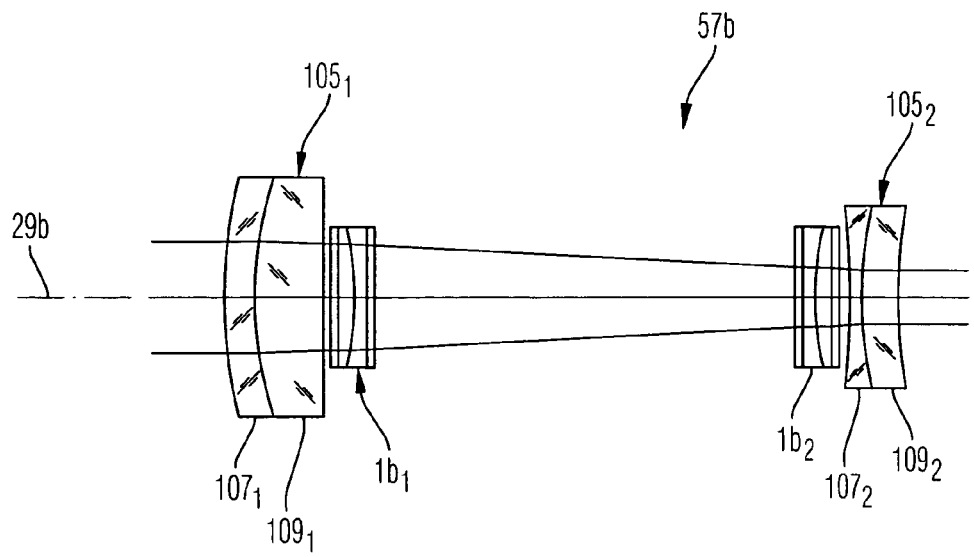
FIG. 6 shows a further embodiment of a zoomable imaging optics having a structure of a Galilean telescope.

FIG. 6 schematically shows a zoom optics 57b which comprises the following optical components successively disposed on a common optical axis 29b: lenses $107_1$ and $109_1$ which are cemented together and form a lens assembly $105_1$ of positive optical power, a lens $1b_1$ of variable optical power, a further lens $1b_2$ of variable optical power, and lenses $107_2$ and $109_2$ which are cemented together and form a lens group $105_2$ of negative optical power. The optical data of the zoom optics $57b$ regarding materials, radii of curvature and vertex distances are indicated in Table 3 below. In this table, SF1, NSK4, NSK2 and NSF56 refer to glass materials which are obtainable from the company SCHOTT, Mainz, Germany:

TABLE 3

| Lens | No. | Radium [mm] | Thickness [mm] | Medium | Free diameter [mm] |
|---|---|---|---|---|---|
| $107_1$ | 1 | 64.1383 | | | 17.0 |
| | | | 2.0 | SF1 | |
| $109_1$ | 2 | 34.6203 | | | 17.0 |
| | | | 4.5 | NSK4 | |
| | 3 | −486.2486 | | | 17.0 |
| | | | 0.5 | Air | |
| $1b_1$ | | | | | |
| | | | 28.8 | Air | |
| $1b_2$ | | | | | |
| | | | 0.5 | Air | |
| | 4 | −130.7438 | | | 13.0 |
| $107_2$ | | | 1.0 | NSK2 | |
| | 5 | 27.4285 | | | 13.0 |
| $109_2$ | | | 2.5 | NSF56 | |
| | 6 | 46.4366 | | | 13.0 |

Lenses $1b_1$ and $1b_2$ of variable optical power are again oppositely controllable by a controller (not shown in FIG. 6) for changing an imaging ratio of the zoom optics $57b$. The following Table 4 indicates the magnifications in three different settings as well as the optical powers adjusted for lenses $1b_1$ and $1b_2$ to this end. Moreover, the last three columns of the table indicate the change in the chromatic longitudinal aberrations of the two lenses $1b_1$ and $1b_2$ as a result of the control as well as the change in the chromatic longitudinal aberration of the zoom optics $57b$ as a whole in these settings:

TABLE 4

| | | Index of refraction [dptr] | | Chromatic longitudinal aberration [dptr] | | |
|---|---|---|---|---|---|---|
| Setting | Magnification | Lens $1b_1$ | Lens $1b_2$ | Lens $1b_1$ | Lens $1b_2$ | System $57b$ |
| 1 | 1.6 | 0 | 0 | 0 | 0 | 0 |
| 2 | 2.0 | 4.5 | −11.7 | −0.5 | 0.4 | −0.1 |
| 3 | 1.3 | −4.5 | 7.8 | 0.2 | −0.3 | −0.1 |

Again, it is inferable from this table that the chromatic longitudinal aberration of the lenses $1b_1$ and $1b_2$ of variable optical power is relatively well compensated in the zoom optics $57b$ as a whole, due to these lenses being oppositely controlled.

Figure 7:
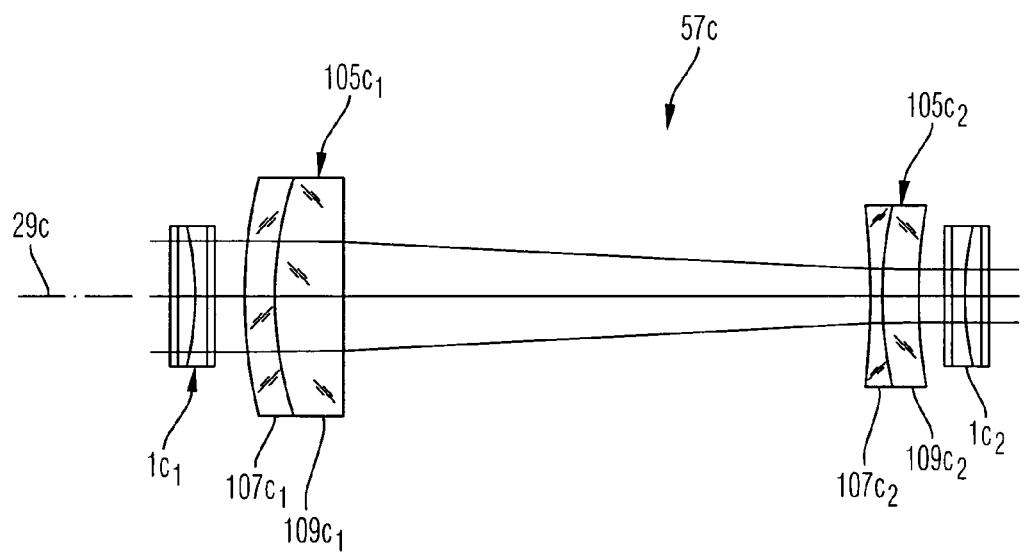
FIG. 7 shows a further embodiment of a zoomable imaging optics having the structure of a Galilean telescope.

FIG. 7 schematically shows a further zoom optics $57c$ which comprises the following components successively disposed along an optical axis $29c$: a lens $1c_1$ of variable optical power, a lens $107c_1$ and a lens $109c_1$ which are cemented together to form a lens assembly $109c_1$ of fixed positive optical power, a lens $107c_2$ and a lens $109c_2$ which are cemented together to form a lens assembly $105c_2$ of fixed negative optical power, and a lens $1c_2$ of variable optical power. The two lenses $1c_1$ and $1c_2$ of variable optical power are again oppositely controllable by a controller (not sown in FIG. 7) to change a magnification of the zoom optics $57c$. The following Table 5 indicates the optical data of the zoom optics $57c$. The lens assemblies of fixed optical power are identical with the lens assemblies indicated in FIG. 6 and Table 3, respectively.

TABLE 5

| Lens | No. | Radius [mm] | Thickness [mm] | Medium | Free Diameter [mm] |
|---|---|---|---|---|---|
| $1c_1$ | | | | | |
| | | | 2.0 | Air | |
| $107c_1$ | 1 | 64.1383 | | | 17.0 |
| | | | 2.0 | SF1 | |
| $109c_1$ | 2 | 34.6203 | | | 17.0 |
| | | | 4.5 | NSK4 | |
| | 3 | −486.2486 | | | 17.0 |
| | | | 34.0 | Air | |
| | 4 | −130.7438 | | | 13.0 |
| $107c_2$ | | | 1.0 | NSK2 | |
| | 5 | 27.4285 | | | 13.0 |
| $109c_2$ | | | 2.5 | NSF56 | |
| | 6 | 46.4366 | | | 13.0 |
| | | | 2.0 | Air | |
| $1c_2$ | | | | | |

Similar to Table 4 relating to the embodiment of FIG. 6, the Table 6 below indicates again for the three magnetization settings the respectively adjusted optical powers of the lenses $1c_1$ and $1c_2$ of variable optical power as well as the changes in the chromatic longitudinal aberration of these two lenses dependent on the control, and it is indicated how said aberration is compensated in the zoom optics $57c$ as a whole:

TABLE 6

| | | Index of refraction [dptr] | | Chromatic longitudinal aberration [dptr] | | |
|---|---|---|---|---|---|---|
| Setting | Magnification | Lens $1c_1$ | Lens $1c_2$ | Lens $1c_1$ | Lens $1c_2$ | System $57c$ |
| 1 | 1.6 | 0 | 0 | 0 | 0 | 0 |
| 2 | 2.0 | 2.7 | −8.6 | −0.4 | 0.3 | −0.1 |
| 3 | 1.3 | −2.7 | 5.7 | 0.2 | −0.2 | −0.0 |

It is evident from Table 6 that the chromatic longitudinal aberrations in the optics $57c$ as a whole are relatively well compensated due to lenses $1c_1$ and $1c_2$ being oppositely controlled. A comparison of Table 6 with Table 4 shows that, in order to produce the same magnification 1.6×, 2.0× and 1.3×, smaller changes in the optical powers of the lenses $1c_1$ and $1c_2$ are necessary in the zoom optics $57c$ than in the embodiment described with reference to FIG. 6. This is due to the fact that the distance between the lenses $1c_1$ and $1c_2$ of variable optical power of the system $57c$ is greater than the distance between the lenses of variable optical power in the embodiment according to FIG. 6.

The embodiments of the zoomable imaging optics described with reference to FIGS. 6 and 7 operate according to the principle of a Galilean telescope, in that a lens group of positive optical power is combined with a lens group of negative optical power.

Figure 8:
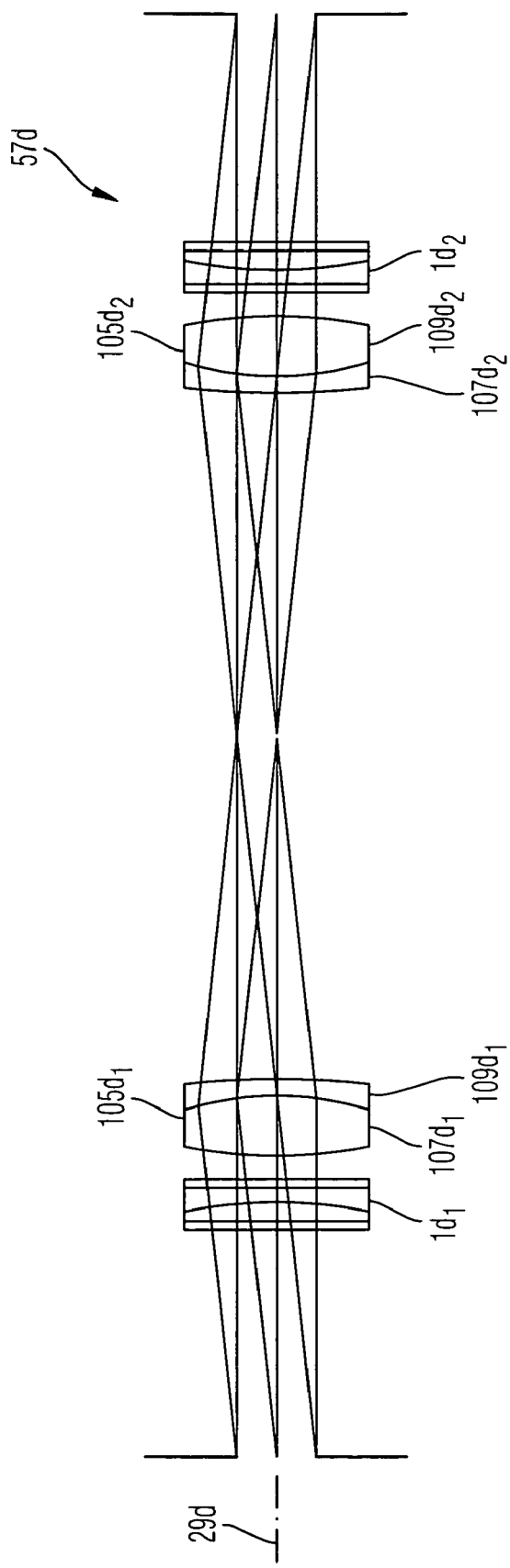
FIG. 8 shows a further embodiment of a zoomable imaging system having the structure of a Keplerian telescope.

FIG. 8 shows schematically a zoomable imaging optics $57d$ which operates according to the principle of a Keplerian telescope, in that two lens groups of positive optical power are combined, an intermediate image being generated between said two lens groups.

The optics $57d$ comprises the following components disposed along a common optical axis $29d$: a lens $1d_1$ of variable optical power, lenses $107d_1$ and $109d_1$ which are cemented together to form a lens assembly $105d_1$ of fixed positive optical power, lenses $107d_2$ and $109d_2$ which are cemented together to form a lens assembly $105d_2$ of fixed positive optical power, and a lens $1d_2$ of variable optical power. Again, a controller (not shown in FIG. 8) is provided for oppositely controlling the lenses $1d_1$ and $1d_2$ of variable optical power to change an imaging ratio and a magnification of the optics $57d$, respectively.

The following Table 7 indicates the optical data of the zoom optics $57d$:

TABLE 7

| Lens | No. | Radius [mm] | Thickness [mm] | Medium | Free diameter [mm] |
|---|---|---|---|---|---|
|  |  |  |  | Pupil | 4.5 |
|  |  |  | 30.6 | Air |  |
| $1d_1$ |  |  |  |  | 10.0 |
|  |  |  | 0.5 | Air |  |
|  | 1 | 30.9734 |  |  | 10.0 |
| $107d_1$ |  |  | 3.0 | NSSK8 |  |
|  | 2 | −13.5988 |  |  | 10.0 |
|  |  |  | 1.0 | SF4 |  |
| $109d_1$ |  |  |  |  |  |
|  | 3 | −38.0658 |  |  | 10.0 |
|  |  |  | 65.5 | Air |  |
|  | 4 | 38.0658 |  |  | 10.0 |
| $107d_2$ |  |  | 1.0 | SF4 |  |
|  | 5 | 13.5988 |  |  | 10.0 |
| $109d_2$ |  |  | 3.0 | NSSK8 |  |
|  | 6 | −30.9734 |  |  | 10.0 |
|  |  |  | 0.5 |  |  |
| $1d_2$ |  |  |  |  | 10.0 |
|  |  |  | 30.6 | Air |  |
|  |  |  |  | Pupil | 4.5 |

The following Table 8 indicates for three different settings of the magnification of the zoom optics $57d$ the optical powers of lenses $1d_1$ and $1d_2$, the change in the chromatic longitudinal aberration dependent on the control and how this chromatic longitudinal aberration is compensated in the zoom optics $57d$ as a whole:

TABLE 8

|  |  | Refractive index [dptr] | | Chromatic longitudinal aberration [dptr] | | |
|---|---|---|---|---|---|---|
| Setting | Magnification | Lens $1d_1$ | Lens $1d_2$ | Lens $1d_1$ | Lens $1d_2$ | System $57d$ |
| 1 | 1.0 | 0 | 0 | 0 | 0 | 0 |
| 2 | 1.3 | −3.9 | 5.1 | 0.2 | −0.2 | −0.0 |
| 3 | 0.75 | 5.1 | −3.9 | −0.1 | 0.1 | −0.0 |

It is evident from Table 8 that, due to the lenses of variable optical power being oppositely controlled, a nearly ideal compensation of the chromatic longitudinal aberration caused by the individual lenses is achieved.

Figure 9:
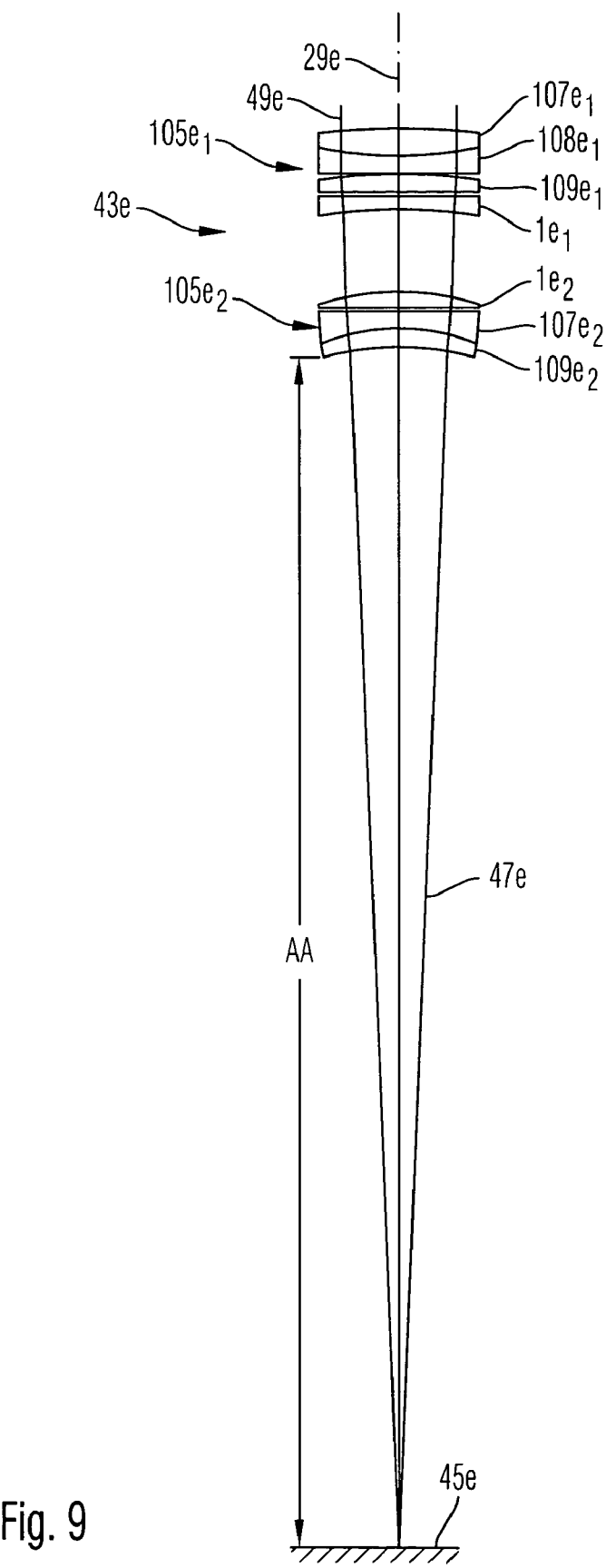
FIG. 9 shows a further embodiment of a zoomable imaging optics in the form of a microscope objective.

FIG. 9 shows schematically a zoomable imaging optics $43e$ for use, for example, as objective in the microscopy system described with reference to FIG. 4. The objective $43e$ comprises the following optical components successively disposed along an optical axis $29e$: a lens assembly $105e_1$ of positive optical power consisting of two lenses $107e_1$ and $108e_1$ cemented together and a lens $109e_1$, a lens $1e_1$ of variable optical power, a further lens $1e_2$ of variable optical power and a lens assembly $105e_2$ of negative optical power consisting of lenses $107e_2$ and $109e_2$. The two lenses $1e_1$, $1e_2$ of variable optical power may be of the type as described with reference to FIGS. 1 and 2 or of the type as described with reference to FIG. 3 or of any other lens type capable of providing a variable optical power. In the embodiment described with reference to FIG. 9, the use of the lens of variable optical power of the liquid crystal type (FIGS. 1, 2) is, however, preferred, because such lenses can be disposed with ease on the planar lens surfaces of lenses $109e_1$ and $107e_2$, respectively. Lenses $1e_1$ and $1e_2$ are again controlled by a controller (not shown in FIG. 9) for providing an adjustable optical power. Being provided as liquid crystal type lenses, lenses $1e_1$ and $1e_2$ have a thickness which is small and constant over its cross-section. The lenses shown in FIG. 9 are symbolized as glass lenses for a specific adjustment of their optical power and provide an optical power corresponding to the individual setting. It is thus evident that the lens $1e_1$ in the setting shown in FIG. 9 provides a negative optical power and lens $1e_2$ provides a positive optical power.

Optical data of the zoomable microscope objective $43e$ are indicated in Table 9:

TABLE 9

| Lens | No. | Radium [mm] | Thickness [mm] | Medium | Free diameter [mm] |
|---|---|---|---|---|---|
| $107e_1$ | 1 | 150.9268 |  |  | 25.0 |
|  |  |  | 4.0 | NPSK53 |  |
| $108e_1$ | 2 | −75.6887 |  |  | 25.0 |
|  |  |  | 3.0 | SF56A |  |
|  | 3 | −383.8371 |  |  | 25.0 |
|  |  |  | 0.1 | Air |  |
| $109e_1$ | 4 | 99.6563 |  |  | 25.0 |
|  |  |  | 3.0 | NLAK8 |  |
|  | 5 | Planar |  |  | 25.0 |
|  |  |  | 0.5 | Air |  |
| $1e_1$ |  |  |  |  | 25.0 |
|  |  |  | 14.0 | Air |  |
| $1e_2$ |  |  |  |  | 25.0 |
|  |  |  | 0.5 | Air |  |
|  | 6 | Planar |  |  | 25.0 |
| $107e_2$ |  |  | 3.0 | NSSK8 |  |
|  | 7 | 31.3879 |  |  | 24.0 |
| $109e_2$ |  |  | 3.0 | NSF6 |  |
|  | 8 | 49.2703 |  |  | 23.0 |
|  |  |  | 200.0 ... 300.0 |  |  |
| $45e$ |  |  | Object plane |  |  |

The objective $43e$ transforms an object-side beam bundle $47e$, emanating from an object plane $45e$, into an image-side beam bundle $49e$ having an afocal beam path. By controlling the lenses $1e_1$ and $1e_2$, it is possible to change both a working distance AA between the object plane $45e$ and the front lens $109e_2$ and the magnification generated by the objective $43e$ and the focal length thereof, respectively. In order to change the magnetization, at a given and held working distance AA, lenses $1d_1$ and $1e_2$ are oppositely controlled by the controller, that is, the optical power of one lens is increased and the optical power of the other lens is decreased.

The following Table 10 indicates six different settings of the control of lenses $1e_1$ and $1e_2$ for producing three different magnifications for each one of two different working distances:

TABLE 10

| Working distance AA [mm] | Focal length f [mm] | Lens $e_1$ $1/f_1$ [dptr] | Lens $e_2$ $1/f_2$ [dptr] |
|---|---|---|---|
| 200 | 240 | −8.7 | 10.8 |
| 200 | 275 | 0 | 0 |
| 200 | 300 | 5.0 | −7.8 |
| 300 | 340 | −12.1 | 13.0 |
| 300 | 385 | −3.7 | 3.6 |
| 300 | 430 | 2.9 | −5.8 |

Figure 10:
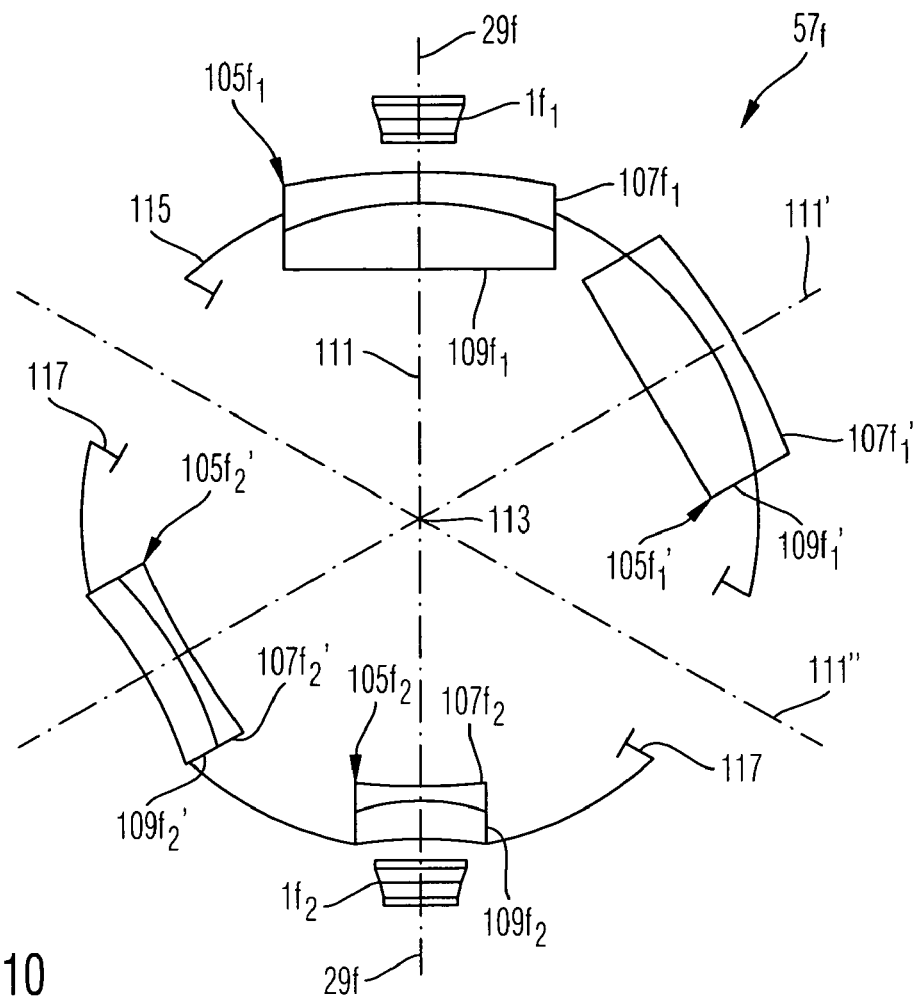
FIG. 10 shows a further embodiment of a zoomable imaging optics with exchangeable partial optics.

FIG. 10 shows a zoom optics $57f$ which, in the shown setting, comprises the following optical components disposed along an optical axis $29f$: a lens $1f_1$ of variable optical power, a lens assembly $105f_1$ of positive optical power consisting of lenses $107f_1$ and $109f_1$ which are cemented together, a lens assembly $105f_2$ of negative optical power consisting of lenses $107f_2$ and $109f_2$ which are cemented together, and a lens $1f_2$ of variable optical power. The lens assemblies $105f_1$ and $105f_2$ are mounted on a support 115 which is rotatable, like a turret, about an axis 113 oriented transversely to the optical axis $29f$. The lens assemblies $105f_1$ and $105f_2$ are mounted on the support 115 on a common optical axis 111 which, in the setting shown in FIG. 10, coincides with the common axis $29f$ of lenses $1f_1$ and $1f_2$ of variable optical power.

Lenses $1f_1$, $1f_2$ are oppositely controllable by a controller (not shown in FIG. 10) for varying a magnification and imaging ratio of the optics $57f$, respectively. If the lenses $1f_1$ and $1f_2$ are controlled such that they provide an optical power of Zero, the optics $57f$ has a basic magnification of 0.4× in the setting shown in FIG. 10.

Two further lens assemblies $105f_1'$ and $105f_2'$ are mounted on the support 115, said lens assemblies having a common optical axis 111' enclosing an angle of 60° with the optical axis 111 of the lens assemblies $105f_1$ and $105f_2$. When the support 115 is rotated counter-clockwise by 60°, the lens assemblies $105f_1$ and $105f_2$ are removed from the beam path between the lenses $1f_1$ and $1f_2$ and the lens assemblies $105f_1'$ and $105f_2'$ are placed into the beam path between the lenses $1f_1$ and $1f_2$ such that the optical axis 111' thereof coincides with the axis $29f$. In this case, when the lenses $1f_1$ and $1f_2$ are controlled such that they provide no optical power, the optics $57f$ provides a basic magnification of 0.6×.

When the support 105 is further rotated counter-clockwise, the lens assemblies $105f_1'$ and $105f_2'$ are removed from the beam path between the lenses $1f_1$ and $1f_2$ and the beam path extends through openings 117 of the support 115 without a lens of fixed optical power being disposed in the beam path between the lenses $1f_1$ and $1f_2$. In this case, when the lenses $1f_1$ and $1f_2$ are controlled to provide no optical power, the optics $57f$ provides a basic magnification of 1.0×. When the support 115 is then further rotated counter-clockwise, the lens assemblies $105f_1$ and $105f_2$ are again placed into the beam path between the lenses $1f_1$ and $1f_2$. However, the lens assembly $105f_2$ is then at the top in FIG. 10 and the lens assembly $105f_1$ at the bottom so that, when the lenses $1f_1$ and $1f_2$ are not controlled, the optics $57f$ provides a basic magnification of 2.5×. If the support 115 is further rotated counter-clockwise by 60°, the optics then provides a magnification of 1.6× when the lenses $1f_1$ and $1f_2$ are not controlled.

In each one of the above-described settings of the support 115, it is possible to oppositely control the lenses $1f_1$ and $1f_2$ in respect of their optical powers in order to vary the magnification provided by the optics 57 substantially continuously starting out from the basic magnification adjusted in each case. As the variation of the optical powers of lenses $1f_1$ and $1f_2$ is limited, the support 115 may then be rotated for a further variation of the magnification in order to provide another basic magnification by the lenses of fixed focal length.

The zoom optics $57f$ can be integrated into the microscopy system described with reference to FIG. 4 for providing in this simple way a continuous change in the magnification over a relatively wide range, without components of the zoom system having to be displaced in longitudinal direction relative to the optical axis.

Figure 11:
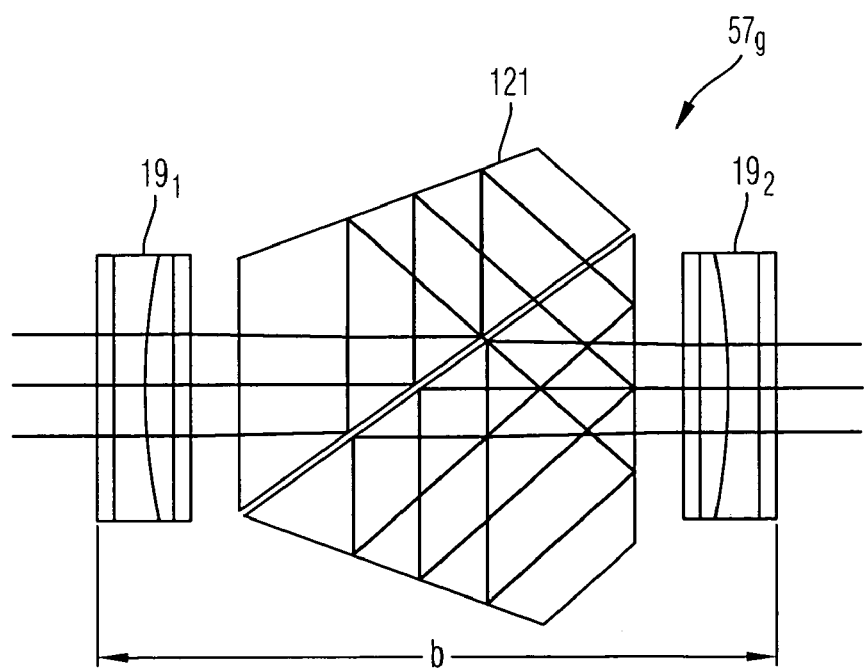
FIG. 11 shows a further embodiment of a zoomable imaging system with two lenses of variable optical power and a folded beam path therebetween.

FIG. 11 shows schematically a further zoomable imaging system $57g$, comprising two lenses $1g_1$ and $1g_2$ of variable optical power and exhibiting an optical action similar to the embodiment described with reference to FIG. 5. However, a Schmidt-Pechan prism 121 is inserted into the beam path between the two lenses of variable optical power for folding the beam path plural times so that an overall length b of the optics is about 22 mm. Without folding the beam path, the overall length would be 40 mm when use is made of otherwise identical optical components. Apart from the use of the Schmidt-Pechan prism 121 for folding the beam path, also other possibilities of deflecting the beam are applicable, such as the use of mirrors, other prism types, such as a Porro-II-prism and the like. By providing a suitable beam folding, it is also possible to achieve a lateral reversal, if desired.

The above-described principles of the imaging optics of variable magnification provides a particularly efficient possibility to provide a product family with two groups of optical devices which differ from each other in that the devices of one group exhibit a zoom function and the devices of the other group do not exhibit a zoom function. The devices of both groups include optical components of fixed focal length which are substantially similar in structure. For example, the radii of curvature, the free diameters and vertex distances of a majority of the optical components of fixed focal length of the corresponding devices of both groups are substantially similar to each other. The devices of the zoomable group then comprise, as against the devices of the other group, at least two lenses of variable optical power which are inserted in the beam path spaced apart from one another. This enables to employ a common manufacturing process for the corresponding devices of both groups, which allows to provide the product group cost-efficiently.

For example, it is possible to employ the objective described with reference to FIG. 9 in a high-price microscope which provides a zoom function, as well as in a low-price microscope which does not provide this function, i.e., not to incorporate the lenses $1e_1$ and $1e_2$, but otherwise to maintain the other lenses $107e_1$, $108e_1$, $109e_1$, $107e_2$ and $109e_2$ substantially unchanged.

Equally, it is possible to use the zoom systems described with reference to FIGS. 6, 7 and 10 together with the lenses of variable optical power in a group of microscopes in a model group and to integrate in another group of models substantially the same zoom optics but which do not include the lenses of variable optical power, but are otherwise of substantially identical structure.

As is commonly known, spherical lenses whose thickness d on its optical axis accounts for much less than the difference of the radial $r_1$ and $r_2$ of its two surfaces can approximately be referred to as "thin lenses" whose optical power $\phi_{DL}$ and dispersion $\eta_{DL}$ is directly proportional to the difference of the inverse radii, i.e., the curvatures $k_1$ and $k_2$ of their two surfaces. For assemblies of two of such thin lenses the following applies, likewise in approximation: the optical power $\phi$ of such an assembly is given by the sum of the optical powers $\phi_a$ and $\phi_b$ of the individual lenses, minus the product of the individual optical powers and the lens distance e:

$$\phi \approx \phi_a + \phi_b - e \cdot \phi_a \cdot \phi_b \qquad (1)$$

The dispersion η of such an assembly of two thin lenses is then given in approximation by the following equation:

$$\eta \approx \eta_a + \eta_b - e \cdot (\eta_a \cdot \phi_b + \eta_b \cdot \phi_a) \qquad (2)$$

Let's consider a system of four thin lenses which are disposed in pairs without a distance therebetween, one of the optical powers of the components of both pairs being fixed ($\phi_{a,b}^f$) and the other one variable ($\phi_{a,b}^v$) This results into a total optical power (e being the distance of the pairs) of:

$$\phi \approx (\phi_a^f + \phi_a^v) + (\phi_b^f + \phi_b^v) - e \cdot (\phi_a^f + \phi_a^v) \cdot (\phi_b^f + \phi_b^v) \qquad (3),$$

and correspondingly a total dispersion of:

$$\eta \approx (\eta_a^f + \eta_a^v) + (\eta_b^f + \eta_b^v) - e \cdot [(\eta_a^f + \eta_a^v) \cdot (\phi_b^f + \phi_b^v) + (\eta_b^f + \eta_b^v) \cdot (\phi_a^f + \phi_a^v)] \quad (4)$$

Of particular importance is a simplified equation, in whose derivation it is presumed that the components of fixed focal lengths are configured such that their dispersion is negligible as compared to the dispersion of the components of variable optical power, i.e.:

$$\eta \approx \eta_a^v + \eta_b^v - e \cdot [\eta_a^v \cdot (\phi_b^f + \phi_b^v) + \eta_b^v \cdot (\phi_a^f + \phi_a^v)] \quad (5)$$

A further simplification is achievable for afocal systems, because in these systems the distance e of the lens pairs must be equal to the sum of the inverse optical powers:

$$\eta \approx \eta_a^v + \eta_b^v - [1/(\phi_b^f + \phi_b^v) + 1/(\phi_a^f + \phi_a^v)] \cdot [\eta_a^v \cdot (\phi_b^f + \phi_b^v) + \eta_b^v \cdot (\phi_a^f + \phi_a^v)] \approx -\eta_a^v \cdot (\phi_b^f + \phi_b^v)/(\phi_a^f + \phi_a^v) - \eta_b^v \cdot (\phi_a^f + \phi_a^v)/(\phi_b^f + \phi_b^v)] \approx -\eta_a^v \cdot \phi_b/\phi_a - \eta_b^v \cdot \phi_a/\phi_b \quad (6)$$

It is inferable from this equation that a compensation of the total dispersion is achievable in an afocal system if the dispersion $\eta_a^v$ and $\eta_b^v$ of the lenses of variable optical power and dispersion bear a ratio to each other which is determined by the squared ratio of the optical powers $\phi_a$ and $\phi_b$, i.e., by the square of the imaging ratio $\Gamma^2$, and only if $\eta_a^v$ and $\eta_b^v$ have different preceding signs. Usually the latter case will occur if both lenses of variable optical power are oppositely controlled, i.e., if their optical powers $\phi_a^v$ and $\phi_b^v$ have also different preceding signs. The variable optical powers to be set are given in an afocal system by the basic imaging ratio $\Gamma_0$ and the imaging ratio $\Gamma$ to be adjusted in each case. Therefore, it is generally not possible or not practicable to achieve an exact compensation of the dispersion for all adjustable imaging ratios. It often suffices to provide such an exact compensation, except for the case that the lenses of variable optical powers are not controlled at all and thus do not provide any dispersion so that the system provides a basic imaging ration, for one further imaging ratio. It is found that, dependent upon the imaging ratio set, the residual dispersion describes a parabolic-type function which, provided that color-corrected components of fixed focal length are provided, intersects zero (corresponding to the negligible dispersion at the basic imaging ratio) and reaches relatively high positive values particularly for very large and very small imaging ratios. The vertex of the parabolic-type curve is near the basic imaging ratio if the optical power dispersion relations (Abbe values) of the two lenses of variable optical power are very similar, and are the more remote from the basic imaging ratio, and shifted towards negative dispersion, the more the Abbe values of the lenses differ from each other. By "negative dispersion" it is meant in the present context that the total optical power for blue light is less than for red light; if, therefore, an afocal system allowed a polychromatic beam bundle which enters the system in parallel to exit in parallel in respect of its green spectral portion, a blue spectral portion would exit the system divergently in case of a negative dispersion and a red spectral portion convergently. In a system with a finite intersection length, a "negative dispersion" means that the intersection length for blue light would be greater than the intersection length for red light.

The above derivation also comprises the case that the two components of fixed focal length have no optical power at all or are not present at all in that Zero is inserted for the respective optical powers and dispersions. It follows for this special case that an optimum dispersion compensation is achieved when the image ratio set corresponds to the ratio of the Abbe values of the lenses of variable optical power. If optically effective components of fixed focal length are present, an optimum dispersion compensation is achieved in similar way if the ratio which the imaging ratio set bears to the basic imaging ratio corresponds to the ratio of the Abbe values of the lenses of variable optical power. Between this imaging ratio given by said relationship and the basic imaging ratio, the residual dispersion is generally negative and varies only little with the adjusted imaging ratio set.

Actually, systems of variable optical power cannot exactly be considered as spaceless, so that every system comprising such lenses must be exactly calculated; the exact conditions for a minimum total dispersion of an imaging system with variable optical power differ in the individual case also for this reason more or less from the above-derived general regularities. Other reasons are a neglection of further substantial aberrations and the different demands made on the residual dispersion which is maximally tolerable for the individual application.

The above-discussed lenses of variable optical power may of course be substituted for by lens systems which each include a plurality of such lenses or which are composed of several ones of such lenses in order to achieve an even better dispersion compensation. For example, two different lenses which are oppositely controlled may be disposed closely one behind the other so that together they provide a considerable optical power, but only a little dispersion; the Abbe value of such a combination would thus be very high. With lenses of the type described with reference to FIG. 3 two individual lenses are integrated to a three-layer structure for this purpose, which structure includes (optionally salt) water in the middle and different oils on both sides thereof. Such a structure can be controlled such that both interfaces shift into the same direction without ever contacting each other. Different lenses of the type according to FIG. 1 can be placed directly on top of each other and oppositely controlled; moreover, lenses of the type according to FIG. 1 can be placed directly on one or both glass covers of lenses of the type according to FIG. 3. These glass covers can also be replaced by ones providing a fixed optical power in that at least one of its surfaces is curved and may, in turn, be dispersion-compensated in pairs.

The only independently variable optical parameter of the lenses of the type shown in FIG. 3 is the curvature k of the interface between the two media (water and oil) which per se are invariable. The optical power of this interface and the dispersion resulting therefrom are directly proportional to one another, so that an Abbe value which is substantially independent of the optical power can be allocated to such lenses as the ratio of adjusted optical power to the dispersion generated thereby. If two of such lenses are integrated in a structure, there must always remain a distance between the two interfaces in order for the latter to be preserved at all as areas which are traversed transversely by the optimal axis, because, if the interfaces contacted one another, a water torus surrounding an oil column would form. What is more is that this distance varies with the generated optical power in a manner which is dependent on the inner structure of the lenses, because the oil and water volumes remain constant, except for the electrostriction effects. Moreover, such lenses, due to the small radii differences and the relatively large lens thicknesses, cannot be calculated exactly as thin lenses. For this reason, it is apparent that a mere approximated calculation of the lens properties is practically not sufficient, and much rather an exact calculation is required. Nevertheless, for the purpose of illustration, an approximated calculation for thin lenses without distance is performed for an integrated structure which comprises a normal dispersive immersion oil on one side and a hardly dispersive immersion oil on the other side, with water in-between. The relevant optical parameters of the three media used are indicated in Table 11. The adjusted radii for three settings (including an optically neutral Zero setting) as well as the resulting optical powers and dispersions are indicated in Table 12:

TABLE 11

| Medium | Refractive index $n_e$ | Abbe value $v_e$ |
|---|---|---|
| Water | 1.3347 | 55.8 |
| Immersion oil Type A | 1.4811 | 56.5 |
| Immersion oil Type B | 1.5178 | 43.0 |

TABLE 12

| | Zero setting | Setting I | Setting II |
|---|---|---|---|
| R(A/H$_2$O) | ~∞ | +36 mm | −12 mm |
| R(H$_2$O/B) | ~∞ | +90 mm | −30 mm |
| φ(A/H$_2$O) | ~0 | −4.1 D | +12.2 D |
| φ(H$_2$O/B) | ~0 | +2.1 D | −6.1 D |
| Optical power φ | ~0 | −2.0 D | +6.1 D |
| η(A/H$_2$O) | ~0 | −0.07 D | +0.21 D |
| η(H$_2$O/B) | ~0 | +0.06 D | −0.20 D |
| Dispersion η | ~0 | ~0.0 D | ~0.0 D |

As is evident from Tables 11 and 12, integrated lens systems of this type are preferably controlled such that the two interface curvatures bear a constant ratio to one another such that the displacement of the vertexes is always effected in the same direction. This requires an opposite change in the respective contact angle, i.e., also an opposite control. It is then achievable that the effective Abbe value of such a system remains largely independent of the optical power of the system. In this case, the above-indicated equation (6) is applicable again, according to which the total dispersion is dependent only on the individual dispersion and the adjusted optical powers of the components. Due to the chromatic aberration being in part already pre-compensated in the integrated systems, however, the effective Abbe values are in this case much higher than in case of an opposite curvature and can also have a negative preceding sign so that the resulting total dispersion can in the ideal case be kept tolerably small over the entire range of the envisaged imaging ratio.

Figure 12:
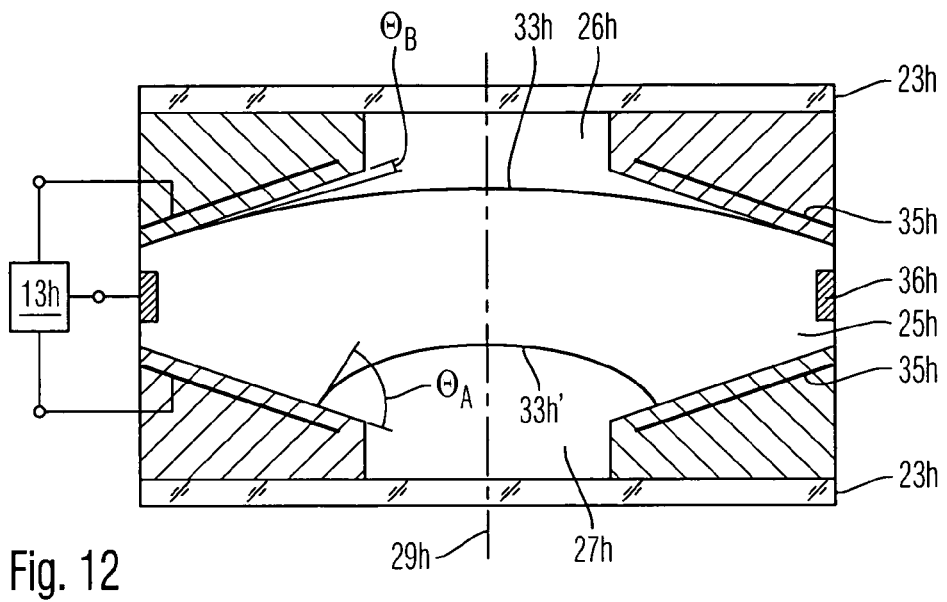
FIG. 12 shows a cross-section through a lens group of variable optical power for use in embodiments of the invention.

FIG. 12 shows schematically an integrated lens combination, the control of which corresponds approximately to the setting I of Table 12. The controller 13$h$ controls both the annular electrode 36$h$ and the two conical electrodes 35$h$ separately. The media 26$h$ and 27$h$ are oils A and B of Table 11. The interfaces 33$h$, 33$h'$ of the water layer 25$h$ between the oils A and B exhibit control-dependent contact angles $\theta_A$ and $\theta_B$, respectively. The glass covers 23$h$ have a thickness of, for example, 0.55 mm.

In analogy to the zoom system shown in FIG. 5 which comprises two lenses of variable optical power of the type according to FIG. 3, the following Table 13 indicates the interface radii, optical powers and dispersions of a similar zoom system consisting of two different lenses, the first lens including an immersion oil of the type A and the second lens, being spaced apart by a distance of e=55 mm, including an immersion oil of the type B:

TABLE 13

| | Zero setting | Power setting |
|---|---|---|
| R(H$_2$O/A) | ~∞ | +16 mm |
| R(H$_2$O/B) | ~∞ | −10 mm |

TABLE 13-continued

| | Zero setting | Power setting |
|---|---|---|
| φ(H$_2$O/A) | ~0 | +9.2 D |
| φ(H$_2$O/B) | ~0 | −18.3 D |
| Optical power φ | ~0 | ~0 D |
| η(H$_2$O/A) | ~0 | +0.16 D |
| η(H$_2$O/B) | ~0 | −0.60 D |
| Dispersion η | ~0 | ~0.0 D |
| Imaging ratio Γ | 1 | ~2 |

Lens assemblies of the integrated type, even if they per se do not fully compensate the chromatic aberration, can also be combined to a zoom of the type shown in FIG. 5. This allows to make additional variation parameters available in order to compensate the chromatic and further (e.g., spherical) aberrations. Moreover, such combinations allow to still further compensate the total chromatic aberration in that integrated lens systems with such residual aberrations are combined which optimally compensate themselves for a specific imaging ratio.

Figure 13:
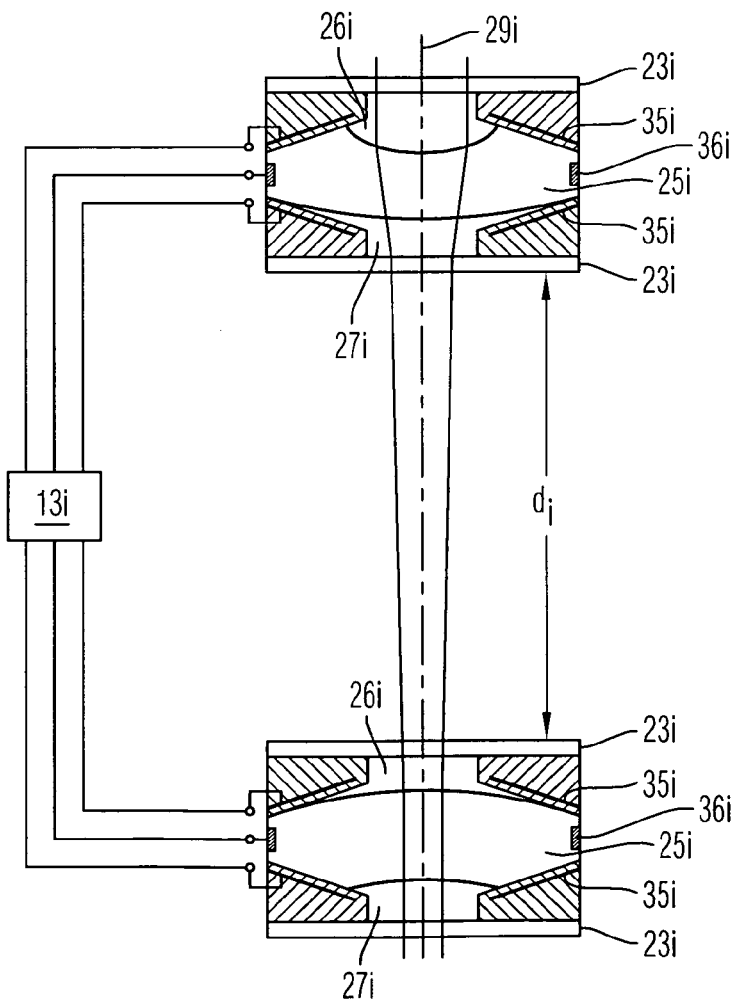
FIG. 13 shows an embodiment of a zoomable imaging system of the Galilean type with two lens groups of variable optical power.

FIG. 13 shows a combination of two of such integrated lens systems disposed on a common optical axis 29$i$ in an afocal system of the Galilean type. The lens systems are controlled in that the sum of their focal lengths, i.e., here the difference of their focal lengths, is about equal to the distance d$_i$ of the lens systems, so that the total optical power of the combination of the two lens systems is just Zero. To this end, the control 13$i$ controls the two annular electrodes 36$i$ and all four conical electrodes 35$i$ separately.

Figure 14:
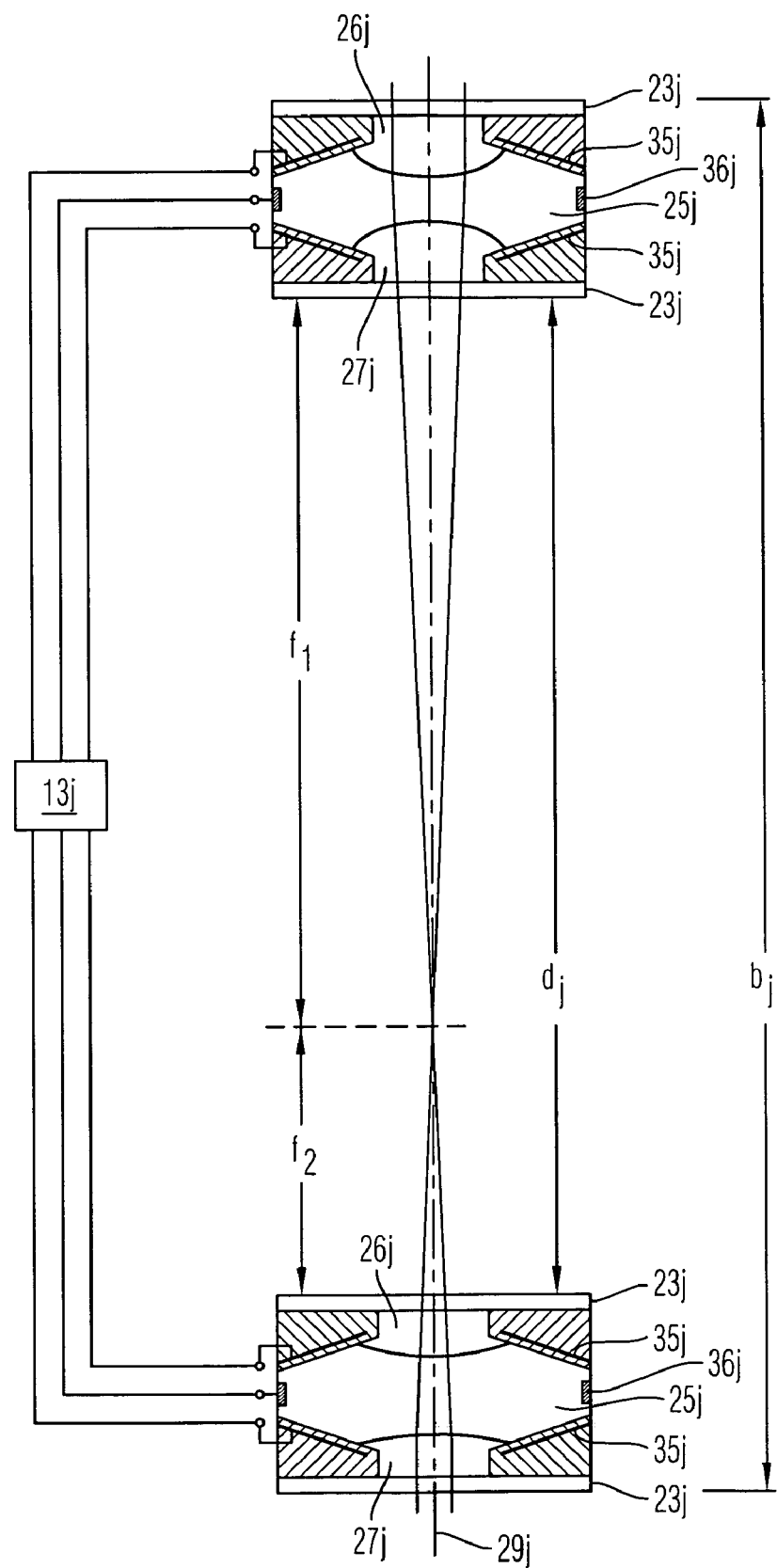
FIG. 14 shows an embodiment of a zoomable imaging system of the Keplerian type with two lens groups of variable optical power.

If, however, the conical electrodes of an integrated lens system are synchronously controlled so that the displacement of the vertexes is effected oppositely, the pre-compensation of the chromatic aberration η is not that good, but the optical power φ is significantly higher (see Table 14). Due to the higher optical power of these lens systems, the overall length is relatively short. Therefore, such systems are suited better for afocal systems of the Keplerian type, as outlined in FIG. 14. In this case, too, the lens systems are controlled such that the sum of their focal lengths is about equal to their distance d$_j$. The compensation of the chromatic aberration can be effected by an appropriate selection of the media of the two integrated systems, at least for a (here negative) nominal imaging ratio Γ$_0$, and/or, if required, by means of further lenses of fixed focal length on the common optical axis 29$j$. As the sum of the individual focal lengths f$_1$ and f$_2$ shall be constant, the focal length of the other lens system is reduced when the focal length of one lens system is increased. This means, that the two lens systems are oppositely controlled in order to maintain the afocality of the combination; this, again, results into an at least partial compensation of the chromatic aberration.

TABLE 14

| | Zero setting | Setting I | Setting II |
|---|---|---|---|
| R(A/H$_2$O) | ~∞ | ±36 mm | ∓12 mm |
| R(H$_2$O/B) | ~∞ | ∓90 mm | ±30 mm |
| φ(A/H$_2$O) | ~0 | ∓4.1 D | ±12.2 D |
| φ(H$_2$O/B) | ~0 | ∓2.1 D | ±6.1 D |
| Optical power φ | ~0 | ∓6.1 D | ±18.3 D |
| η(A/H$_2$O) | ~0 | ∓0.07 D | ±0.21 D |
| η(H$_2$O/B) | ~0 | ∓0.07 D | ±0.20 D |
| Dispersion η | ~0 | ∓0.14 D | ±0.41 D |
| Abbe value | Not determined | ~44 | ~45 |

In the objective system shown in FIG. 9, the distance between the lenses of positive and negative optical power is so large, or the negative optical power is so small as compared to the positive optical power, that, in total, a positive optical power results: It is evident from the second line of Table 10 that, when the lenses of variable optical power are not controlled, the focal length f of this objective is 275 mm and the working distance AA is 200 mm. As described above, by oppositely controlling the lenses of variable optical power, the lens assemblies of positive and negative optical power can be influenced such that other focal lengths and/or working distances are obtained. According to what has been described above with reference to equations (1) to (5), the dispersion of the lenses of variable optical power then also changes, and thus the total dispersion. As the distance between the lens assemblies is not defined in any further detail, it is in this case not possible anymore to indicate a specific optimal ratio of the individual dispersions; rather, this ratio lies in one of two ranges which are described below:

If the lenses of variable optical power are controlled such that the lens disposed rearwardly in the beam path has a positive optical power and the lens disposed in the front in the beam path has a negative, but in absolute terms a considerably higher optical power, the two lenses of variable optical power, due to their small distance as compared to the difference of their inverse optical powers, have the combined action of a component having a negative optical power (Equation 1). However, in correspondence with a relatively long objective focal length, the distance of the lens assemblies (see above) is larger than it corresponds to an afocal system, the optimal dispersion ratio regarding the chromatic aberration compensation must lie beyond the optimum value for an afocal system ($\eta_a^v{}_{opt} \cdot \phi_b/\phi_a = -\eta_b^v{}_{opt} \cdot \phi_a/\phi_b$, see Equation 6):

$$e > 1/\phi_a + 1/\phi_b\ \hat{}\ e > 0 \tag{7a}$$

$$\phi > \phi_a + \phi_b\ \hat{}\ \phi > 0\ (\text{because } e \cdot \phi_a \cdot \phi_b < 0) \tag{7b}$$

$$|\eta_a^v/\eta_b^v|_{opt} > (\phi_a/\phi_b)^2\ (\text{wherein } |\phi_a| > |\phi_b|) \tag{7c}$$

However, with simple lenses of variable optical power of the same structure only $|\eta_a^v/\eta_b^v|_{opt} \approx |\phi_a/\phi_b|$ is achievable. Therefore, the lenses of variable optical power should in such a case be composed differently or/and composed such that the above inequality is fulfilled.

If the lenses of variable optical power are controlled such that the lens disposed rearwardly in the beam path has a negative optical power and the front lens in the beam path has a positive, but in absolute terms, a higher optical power, the two lenses of variable optical power have the combined action, independent of their distance, of an element of positive optical power (see Equation 1) in correspondence with a relatively short objective focal length. As, in this case, the positive optical power of the lens assembly which is closer to the object already exceeds the negative contribution of the lens assembly which is more remote from the object and the distance-dependent term is likewise positive, an optimal chromatic aberration correction is again not achievable with simple lenses of variable optical power of the same structure (see Equation 2 with two positive terms because $\eta_a + \eta_b > 0$). One possibility to compensate for chromatic aberrations consist in the selection of a higher dispersive lens of variable optical power for the lens assembly disposed more remote from the object and a low dispersive lens of variable optical power for lens assemblies disposed closer to the object. What is meant by high and low dispersive in the present case is that the dispersion is smaller and higher, respectively, at the same optical power, i.e., an effective Abbe value would be smaller and higher, respectively. Again, it is not possible to achieve a complete chromatic aberration compensation over the entire working distance and focal length range; however, except for the case where the lenses of variable optical power are not controlled, it is possible for a still further case, e.g., that of line 5 of Table 10 (working distance 300 mm, focal length 385), to obtain a compensation as optimal as possible, so that at the two working distances an about equally well chromatic aberration compensation is provided.

In principle, it is also possible for imaging purposes to use two-stage zoom optics, together with further lenses of fixed focal length, the total optical power of said zoom optics being negative in that the distance between two lens assemblies in said zoom systems is smaller than it corresponds to an afocal (Galilean) system, provided that the optical powers of the two lens assemblies have a different preceding sign, or is larger than it corresponds to an afocal (Keplerian) system, provided that the optical powers of the two lens assemblies have the same, namely positive, preceding sign. Of interest in this respect is particularly the first case, due to the shorter overall length, in which case the distance of the lens assembly is thus between Zero and the distance for an afocal system having the predetermined optical powers of the two lens assemblies (i.e., the sum of the inverse optical powers). Accordingly, the optimum value for the ratio of the individual dispersion lies between the value for a spaceless system (namely $\eta_a^v{}_{opt} = -\eta_b^v{}_{opt}$; see Equation 2 with e=0) and the optimum value for an afocal system (Equation 6):

$$0 < e < 1/\phi_a + 1/\phi_b \tag{8a}$$

$$0 > \phi > \phi_a + \phi_b \tag{8b}$$

$$1 < |\eta_a^v/\eta_b^v|_{opt} < (\phi_a/\phi_b)^2\ (\text{wherein } |\phi_a| > |\phi_b|) \tag{8c}$$

This applies, for example, to a case wherein an integrated system of the type shown in FIG. 12 consisting of two lenses of the type shown in FIG. 3 is controlled such that the difference in the values of the individual inverse optical powers exceeds the, as mentioned, unavoidable distance of the interfaces and the negative optical power of the one interface is higher in value than the positive optical power of the other interface. An optimum control of such a system preferably takes account of the interface distance which changes with the adjusted optical power.

Moreover, in these lens systems the dispersion is at least approximately proportional to the optical power, so that in each case an effective Abbe value $v = \phi/\eta$ can be indicated which is even largely independent of the adjusted optical power and is determined only by the optical parameters of the liquids contained in the lens. On this condition, it follows from Equation 8c the optical value range in respect of the chromatic aberration compensation for the (amount)ratio of these Abbe values:

$$|\phi_b/\phi_a| < |v_b/v_a|_{opt} < |\phi_a/\phi_b|\ (\text{wherein } |\phi_a| > |\phi_b|) \tag{9a}$$

For systems with particularly small interface distances or, to be more exact, principal plane distances, the optimum is nearer to the lower limit, i.e.:

$$|\phi_b/\phi_a| < |v_b/v_a|_{opt} < 1\ (\text{wherein } |\phi_a| > |\phi_b|) \tag{9b}$$

Accordingly, for systems with particularly small differences in the optical power, or larger interface distances, the optimum is thus nearer to the upper limit, i.e.:

$$1 < |v_b/v_a|_{opt} < |\phi_a/\phi_b|\ (\text{wherein } |\phi_a| > |\phi_b|) \tag{9c}$$

As in all other above-described examples, the optimum choice for the individual dispersions and Abbe values, respectively, is also dependent on the further aberrations, particularly spherical aberrations, which must also be compensated, and on the residual aberrations which is still tolerable in the respective application.

In the following, embodiments of the stereo-microscopy system according to the invention are described which make use of optical assemblies of variable optical action.

Figure 15:
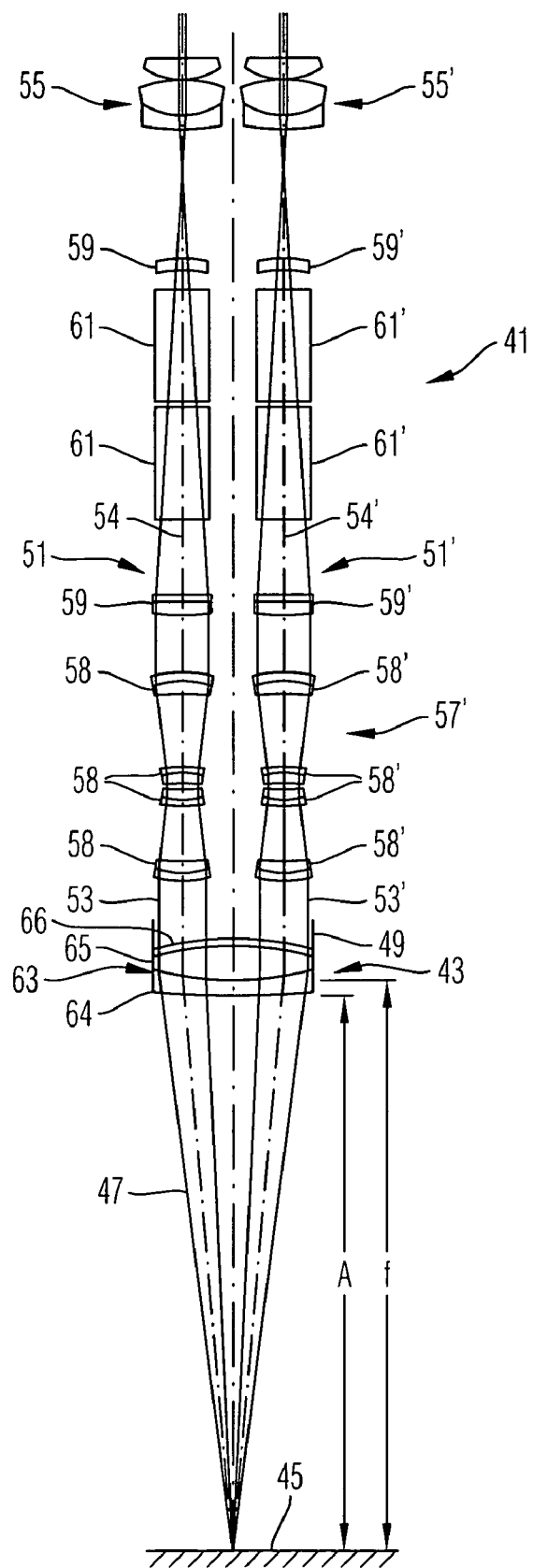
FIG. 15 shows a stereo-microscopy system including a common objective of variable focal length for two stereo beam paths.

In the objective shown in FIG. 15, the lens assembly 63 further includes a lens 66 of variable optical power which is disposed on the side of lens 65 which is not cemented with lens 64. The structure of lens 66 of variable optical power corresponds to that described with reference to FIG. 1. To this end, the assembly 1 described with reference to FIG. 1 is provided in the form of a flexible film which has a thickness of about 100 µm and is fixedly connected to the lens 65 over the entire surface thereof. However, it is also possible to dispose the lens 66 of variable optical power spaced apart from the surface of lens 65, for example, on a planar glass support.

Equally, it is possible to dispose the lens of variable optical power on the surface of lens 64 which is not cemented with lens 65.

Optical data of both lenses 64 and 65 regarding materials, radii of curvature and vertex distances are indicated in Table 15 below. In this table, NSSK8 and NSF56 refer to glass materials which are obtainable from the company SCHOTT, Mainz, Germany.

TABLE 15

| Lens No. | Surface No. | Radius [mm] | Thickness/ Airgap [mm] | Glass/ Medium | Free diameter [mm] |
|---|---|---|---|---|---|
| | 1 | 142.549 | | | 43.0 |
| 65 | | | 6.5 | NSSK8 | |
| | 2 | −105.481 | | | 43.0 |
| 64 | | | 3.5 | NSF56 | |
| | 3 | −364.018 | | | |
| | | | 200.0 | Luft | 43.0 |
| | | Object plane | | | |

Accordingly, an overall height of the lens assembly 63 is 10 mm, and a focal length of the two lenses 65 and 64 together is 205 mm, so that the focal length of the total lens assembly 63 consisting of lenses 64, 65, 66 is 205 mm if the lens 66 of variable optical power provides an optical power of 0 dptr.

Figures 15A, 15B, 15C:
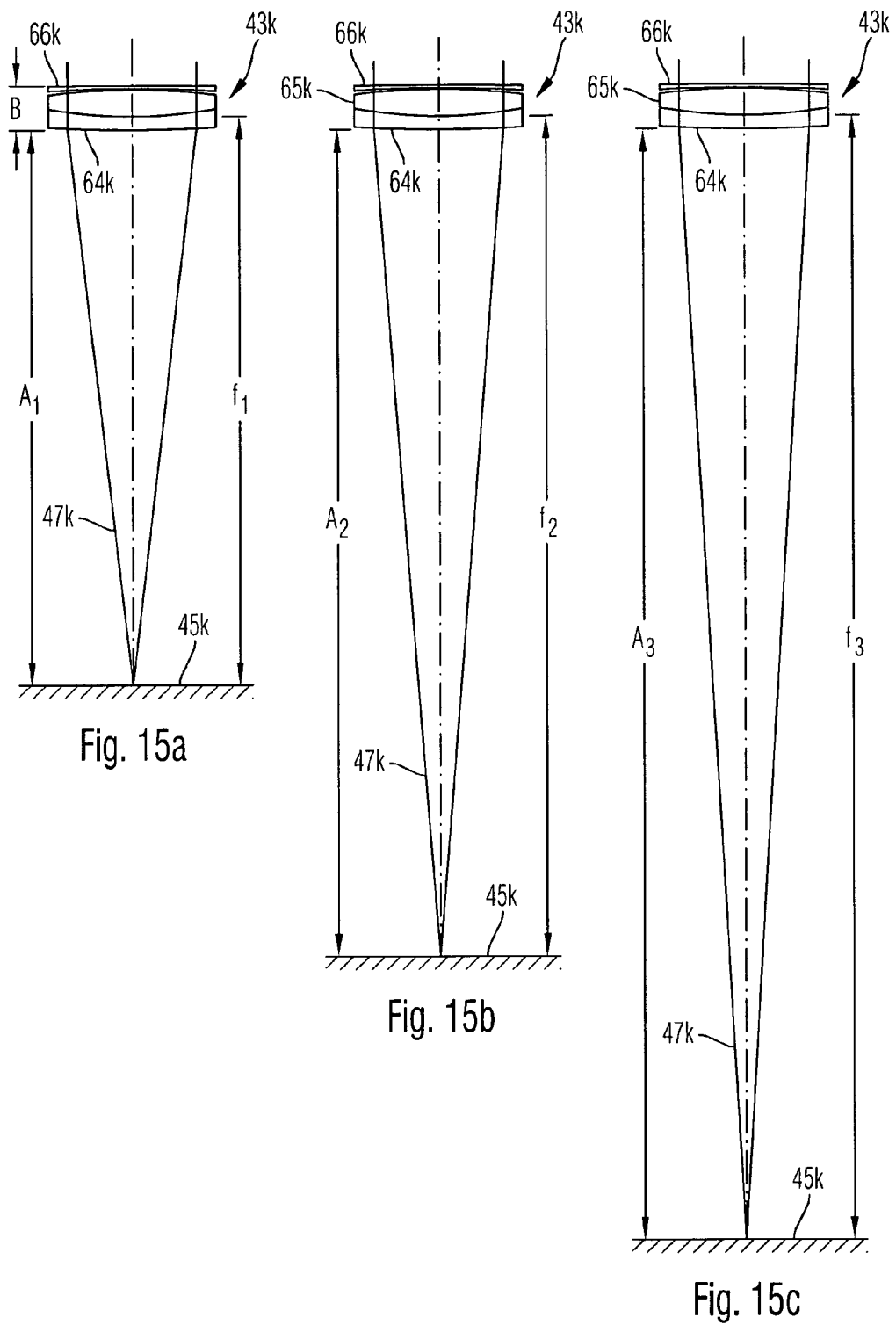
FIG. 15a to FIG. 15c are partial views of the objective of the stereo-microscopy system of FIG. 15 in different settings.

FIGS. 15a, 15b, 15c show beam paths of the object-side beam bundle 47k between the object plane 45k and the objective 43k for three different settings of the optical power of lens 66k. Moreover, FIGS. 15a, 15b, 15c show for each setting the focal length f of the objective 43k and the working distance A between the object plane 45k and the lens surface 64k facing the same.

In the setting of FIG. 15a, lens 66k provides an optical power of 0 dptr. In the setting of FIG. 15b, lens 66k provides an optical power of −1.6 dptr. FIG. 15b does not show lens 66k as layer of constant thickness, but symbolically as a convex lens of glass material which likewise provides an optical power of −1.6 dptr. In the setting of FIG. 15c, lens 66k provides an optical power of −2.4 dptr. Here, too, lens 66k is symbolically represented as glass lens of corresponding optical power.

The optical data of the objective 43k in the three settings shown in FIGS. 15a to 15c are summarized in Table 16 below.

TABLE 16

| Setting | A [mm] | f [mm] | 1/f [dptr] | Δ1/f [dptr] |
|---|---|---|---|---|
| 1 | 200 | 205 | 4.9 | 0 |
| 2 | 300 | 304 | 3.3 | −1.6 |
| 3 | 400 | 403 | 2.5 | −2.4 |

In the following, further variants of the embodiment described with reference to FIGS. 1 to 4 are described. Components which correspond in structure and function to the components of FIGS. 1 to 4 are designated by the same reference numbers, but, for the purpose of distinction, are supplemented by an additional letter. In this respect, reference is taken to the entire above description.

FIG. 16 shows a variant of an afocal zoom system 571 for use in the microscopy system of FIG. 4. In FIG. 4, the zoom system 57 of variable magnification is controlled in that two of the four lens groups 58 of the zoom system 57 are displaceable along an optical axis 54 of the partial stereo optics 51. The zoom system 571 shown in FIG. 16 comprises two lens assemblies $581_1$ and $581_2$ which are disposed spaced apart from each other at a fixed distance along an optical axis 541 of the zoom system 571. The lens assembly $581_1$ is disposed near the objective, not shown in FIG. 16, and the lens assembly $581_2$ is disposed near the tube, likewise not shown in FIG. 16. The lens assembly $581_1$ comprises a lens of negative optical power $71_1$ which is cemented together with a lens $72_2$ of positive optical power. A lens $73_1$ of variable optical power is disposed over the entire surface of lens $72_1$ which is not cemented with the lens $71_1$, in similar manner as it has already been described with reference to FIGS. 3 and 4 for the lens 66 of the objective 43.

The lens assembly $581_2$ comprises a lens $71_2$ of negative optical power which is cemented with a lens $72_2$ of positive optical power. A lens $73_2$ of variable optical power is likewise disposed over the entire surface of the lens $71_2$ which is not cemented with the lens $71_2$. The lenses $73_1$ and $73_2$ of variable optical power are controlled by a controller 131 for controlling their optical powers to change the magnification of the zoom system 571.

Figure 16A:
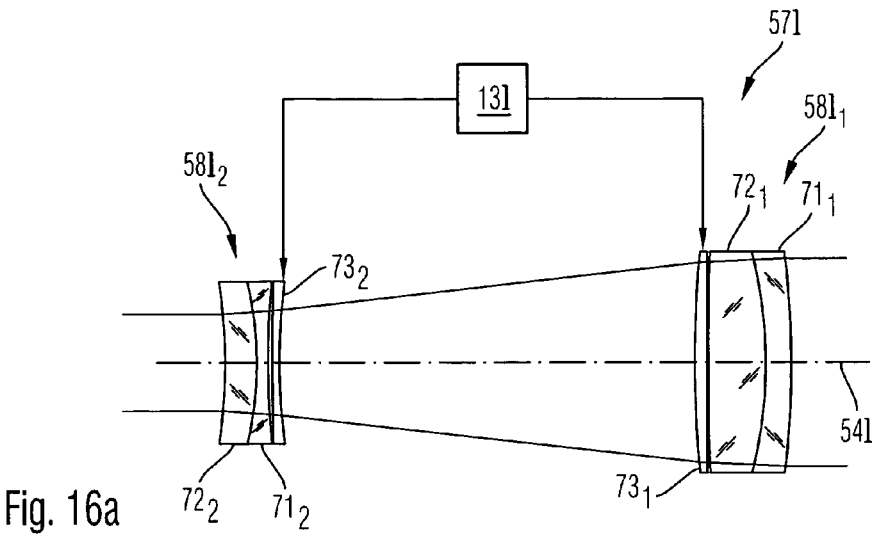
FIG. 16a to FIG. 16c are partial views of a variant of the stereo-microscopy system of FIG. 4 with a zoom system of variable magnification.
Figure 16B:
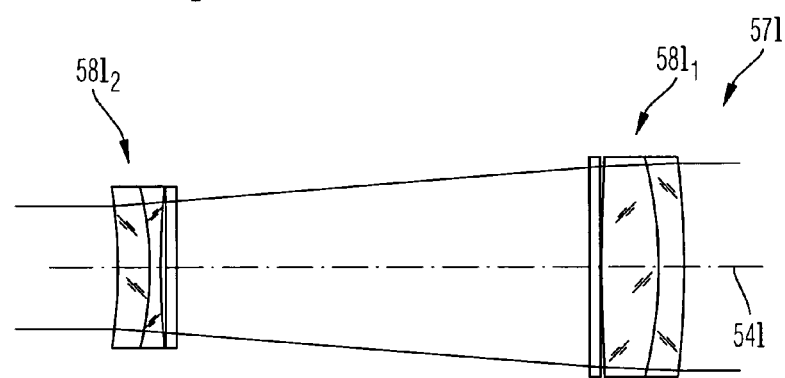
Figure 16C:
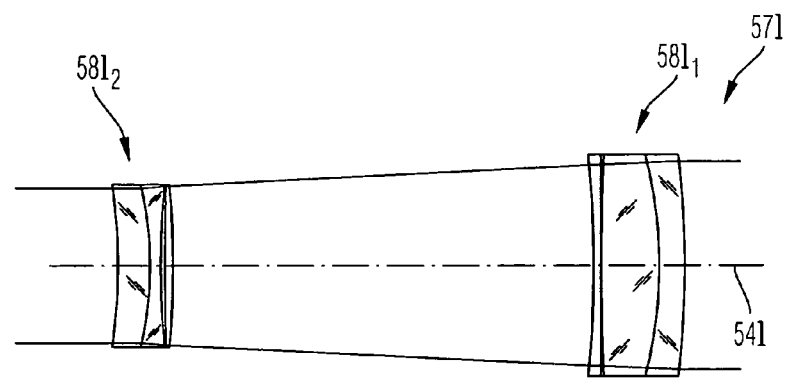

FIGS. 16a, 16b, and 16c show three different settings of the zoom system 571 for three different magnifications. Here, too, the lenses $73_1$ and $73_2$ are not shown as layers of constant thickness, but as corresponding lenses of glass which provide an optical power according to the respective setting.

The optical data of lenses $71_1$, $72_1$, $71_1$ and $72_2$ regarding materials, radii of curvature and vertex distances are indicated in Table 17 below. In said table, SF1, NSK4, NSK2 and NSF56, again, refer to glass materials which are obtainable from the company SCHOTT, Mainz, Germany.

TABLE 17

| Lens No. | Surface No. | Radius [mm] | Thickness/ Airgap [mm] | Glass/ Medium | Free diameter [mm] |
|---|---|---|---|---|---|
| | 1 | 64.1383 | | | 17.0 |
| 711 | | | 2.0 | SF1 | |
| | 2 | 34.6203 | | | 17.0 |
| 721 | | | 4.5 | NSK4 | |
| | 3 | −486.249 | | | 17.0 |
| | | | 34.0 | Luft | |
| | 4 | −130.744 | | | 13.0 |
| 712 | | | 1.0 | NSK2 | |
| | 5 | 27.4285 | | | 13.0 |
| 722 | | | 2.5 | NSF56 | |
| | 6 | 46.4366 | | | 13.0 |

Table 18 below indicates the values for the magnifications provided by the zoom system 571 in the three settings according to FIGS. 16a, 16b, 16c as well as the respectively set optical powers of lenses $73_1$ and $73_2$ are indicated.

TABLE 18

| Setting | Magnification | 1/f (dptr) Lens $73_1$ | 1/f (dptr) Lens $73_2$ |
|---|---|---|---|
| 1 (FIG. 5a) | 2.0 | 4.1 | −11.2 |
| 2 (FIG. 5b) | 1.6 | 0 | 0 |
| 3 (FIG. 5c) | 1.3 | −4.1 | 7.5 |

FIG. 17 shows an ocular 55m for use in a stereo-microscopy system.

The ocular 55m comprises a lens assembly 80 consisting of a lens 81 of negative optical power which faces the tube of the stereo-microscopy system and is cemented with a lens 82 of positive optical power, and a further lens of positive optical power 83 which has applied thereon over its entire surface a lens 84 of variable optical power. The lens 84 of variable optical power is controllable by a controller 13m to change the optical power of lens 84 thereof in order to compensate a vision defect of an eye viewing through the ocular 55m.

Figure 17A:
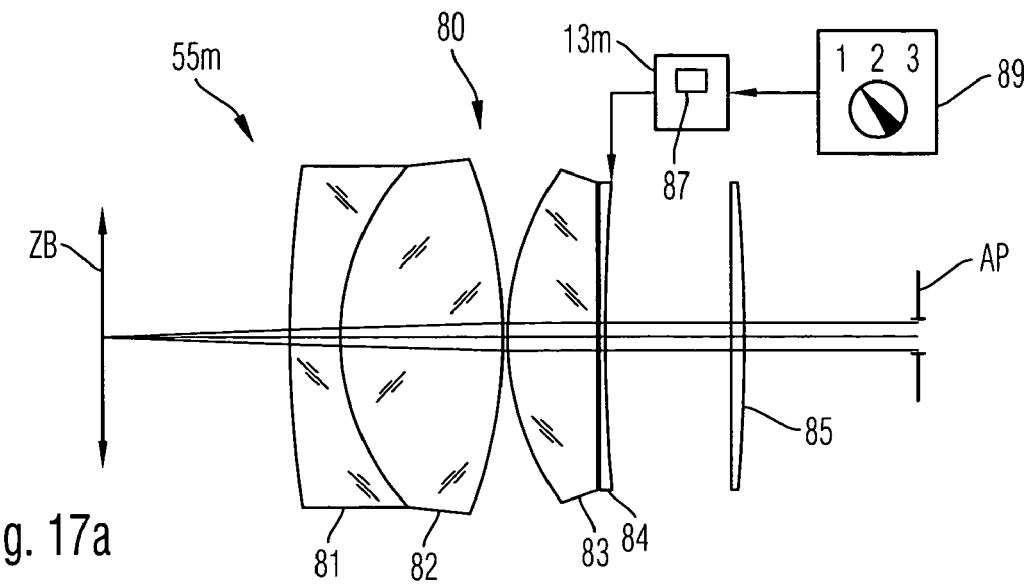
FIG. 17a to FIG. 17c are partial views of a further variant of the stereo-microscopy system of FIG. 4 with oculars for compensating different vision defects of the users.
Figure 17B:
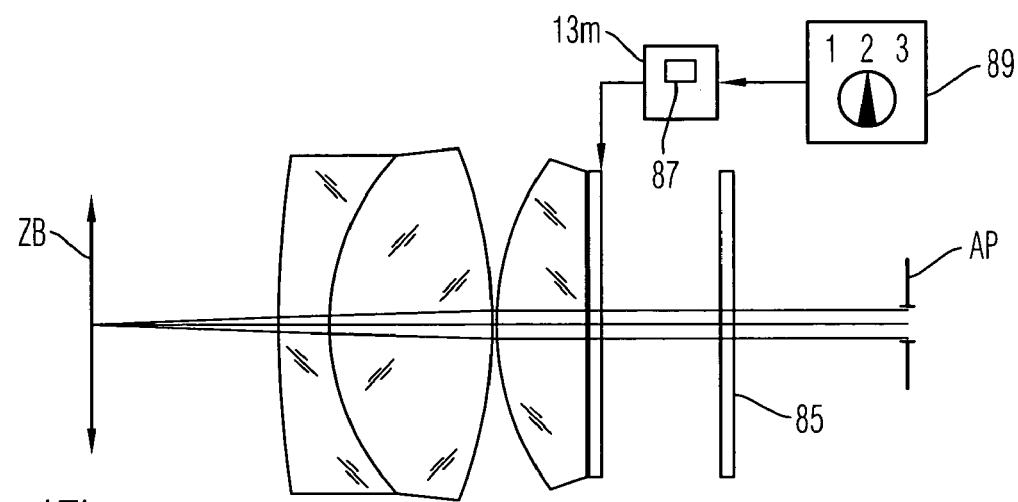
Figure 17C:
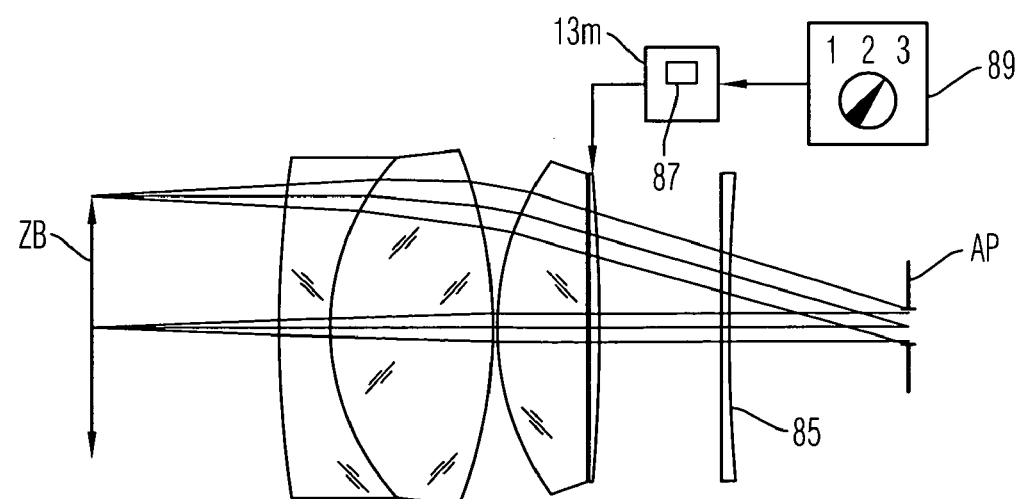

FIGS. 17a, 17b, 17c show three different settings of the ocular 55m, the eye viewing through the ocular 55m being symbolically represented by an eye pupil AP and a lens 85 which symbolizes the vision defect. In FIG. 17a the vision defect is +4 dptr and the lens 85 symbolizing the vision defect is shown as plano-convex lens. In FIG. 17b the vision defect is 0 dptr, i.e., the eye is of ideal vision, and the lens 85 symbolizing the vision defect is shown as plano-parallel plate. In FIG. 17c, the vision defect is −4 dptr and the lens 85 symbolizing the vision defect is accordingly shown as plano-concave lens. Reference sign ZB indicates in FIGS. 17a, 17b and 17c an intermediate image generated by the tube of the microscopy system.

Optical data of the lenses 81, 82, 83 of the ocular 55m regarding materials, radii of curvature and vertex distances are evident from Table 19 below. Again, SF56A and SK55 refer to glass materials which are obtainable from the company SCHOTT, Mainz, Germany.

TABLE 19

| Lens No. | Surface Nr. | Radius [mm] | Thickness/ Airgap [mm] | Glass/ Medium | Free diameter [mm] |
|---|---|---|---|---|---|
| | | | Intermediate image 14.47 | | |
| | 1 | 122.32 | | | 28.0 |
| 81 | | | 4.0 | SF56A | |
| | 2 | 21.288 | | | 28.0 |
| 82 | | | 13.0 | SK55 | |
| | 3 | −38.681 | | | 29.0 |
| | | | 0.3 | Air | |
| | 4 | 24.406 | | | 27.5 |
| 83 | | | 7.2 | SK55 | |
| | 5 | Planar | | | 25.2 |
| | | | 25.0 Eye pupil | | |

In FIGS. 17a, 17b, 17b, too, lens 84 of variable optical power is not shown as a layer of constant thickness, but as a glass lens which is ground such that provides an optical power corresponding to lens 84.

The controller 13m comprises a memory 87 for storing the characteristics of the three different settings of lens 84 shown in FIGS. 17a to 17c. These characteristics are selectively fetched from the memory 87 to adjust the lens 84 accordingly. In order to change the setting, a selection switch 89 is coupled to the control 13m, which switch offers three selectable settings in the depicted embodiment. Accordingly, in the depicted embodiment, the ocular 55m can thus be quickly switched over in order to compensate a vision defect of +4 dptr of a first user for the latter to optimally perceive the stereoscopic image, in order to provide a setting for the second user with optimal vision for the latter to optimally perceive the stereoscopic image as well, and in order to offer a setting for a third user, which setting compensates a vision defect of −4 dptr. For other or further users, the memory may then contain other characteristics for the respective vision defects. The stored value can be predetermined by means of an input means, not shown in FIG. 17.

Figure 18:
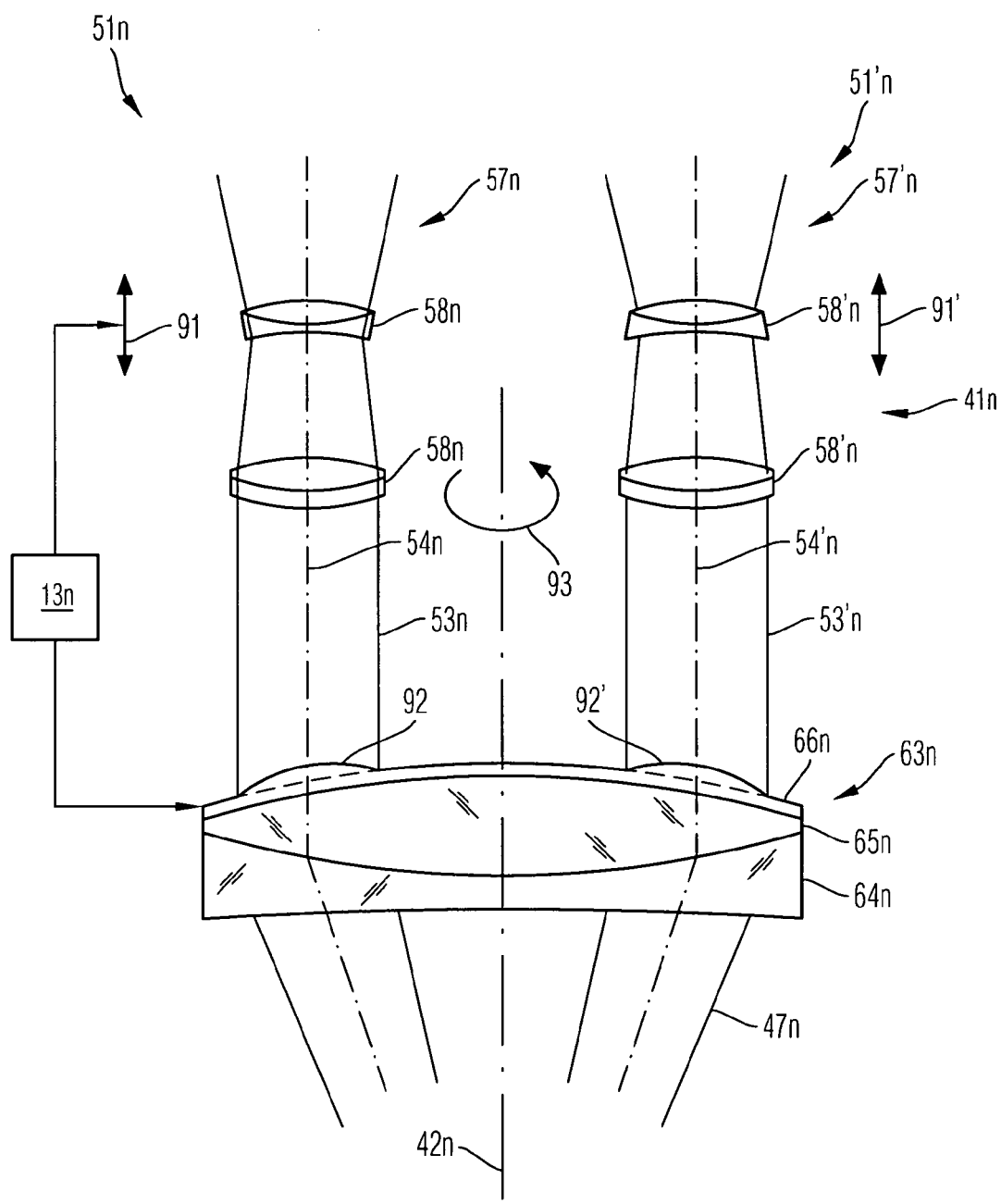
FIG. 18 shows a further variant of the stereo-microscopy system shown in FIG. 15.

FIG. 18 shows a further variant of the stereo-microscopy system described with reference to FIGS. 4 and 15 which differs from the latter in the way a lens 66n of variable optical power is controlled. The lens 66n is not only controlled to change a working distance in that it provides a variable round lens action in respect of an optical axis 42n of the objective 63n, but still provides an additional round lens action in respect of optical axes 54n and 54'n of a left-hand partial stereo optics 51n and a right-hand partial stereo optics 51'n, respectively. Zoom systems 57n and 57'n of the partial optics 51n and 51'n, respectively, comprise lens assemblies 58n and 58'n, respectively, which are displaceable along the optical axes 54n and 54'n, respectively, of the partial optics, as this is symbolically represented by arrows 91 and 91' in FIG. 7. The displacement of the lens assemblies 58n, 58'n for changing a magnification provided by the zoom systems 57n, 57'n is effected by a controller 13n which likewise controls the lenses 66n of variable optical power.

The lens 66n of variable optical power is controlled dependent on the adjusted magnification in order to provide in the respective partial beam bundle 53n, 53'n an additional optical power, as it is represented in FIG. 18 by symbolical convex lenses 92 and 92'. As a result, the lens 66n of variable optical power can assume the function of the zoom systems 57n, 57'n so that the latter as such can operate with at least one optical component less than usual.

The zoom systems 57n, 57'n are displaceable about the optical axis 42n of the objective 43n in circumferential direction, as intimated by arrow 93 in FIG. 7. Accordingly, the optical axes 54n, 54'n are displaced in circumferential directional about the optical axis 42n, and the control 13 controls the lens 66n continuously such that the additional lens actions 92, 92' are provided symmetrically in respect of the axes 54n and 54'n, respectively.

Figure 19:
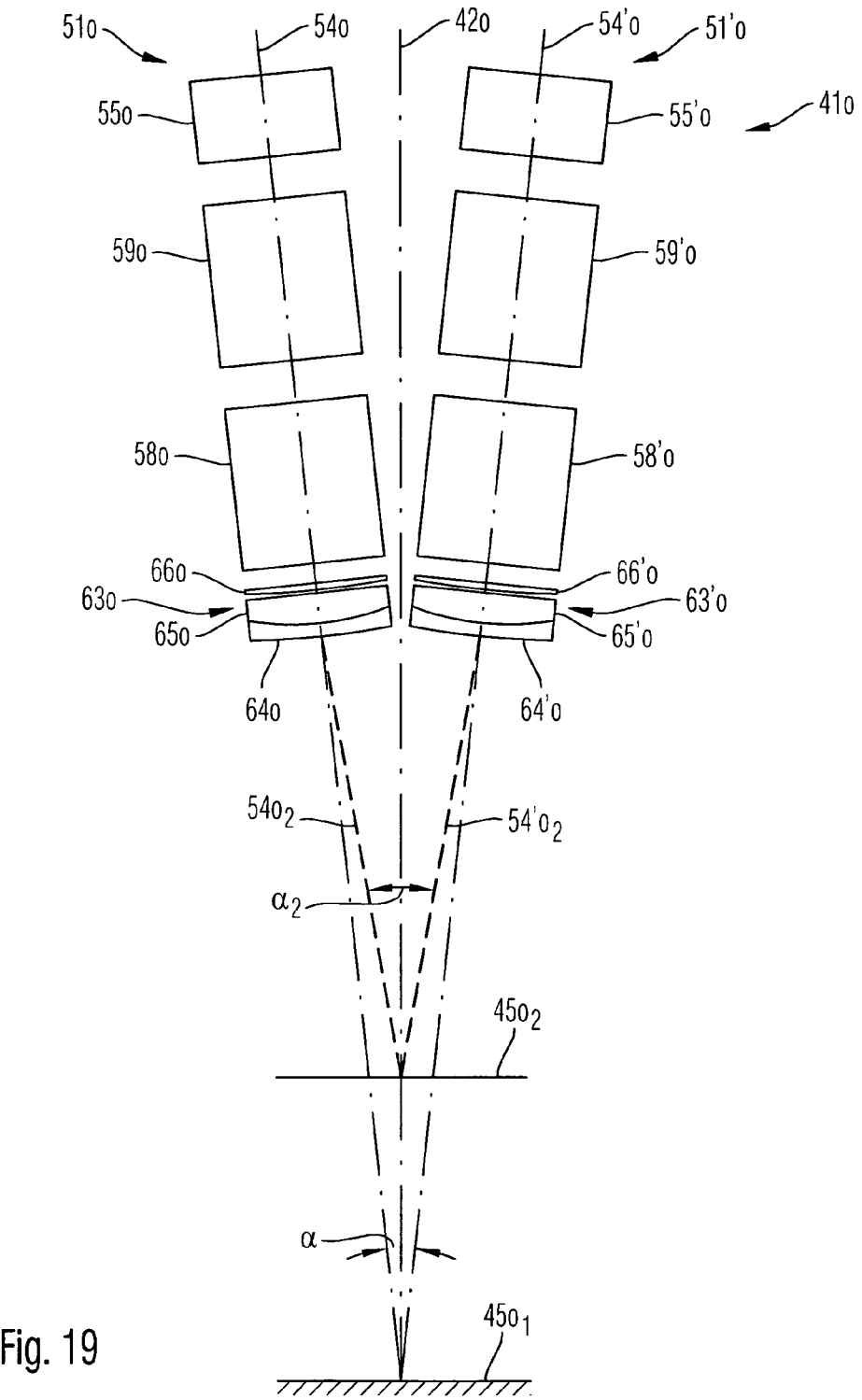
FIG. 19 shows an embodiment of a stereo-microscopy system with separate objectives for the two stereo beam paths and variable working distance.

FIG. 19 shows schematically a further stereo-microscopy system 41o. In contrast to the above-described stereo-microscopy systems, the stereo-microscopy system 41o comprises two partial stereo optics 51o and 51'o, each of which includes a separate objective 63o and 63'o, respectively, as well as symbolically represented zoom systems 58o and 58'o and, moreover, a tube 59o and 59'o, respectively, and an ocular 55o and 55'o, respectively. The objective 63o (63'o), the zoom system 58o (58'o), the tube with field lens 59o (59'o) and the ocular 55o (55'o) are disposed symmetrically along the optical axis 54o (54'o) and fixedly supported in a housing 101 of the stereo-microscopy system such that the optical axes 54o and 54'o enclose an angle α of about 6°, the axes 54o, 54'o being disposed symmetrically in respect of principal axis 42o of the stereo microscopy system 41o.

The objectives 63o and 63'o are identical in structure with a lens 64o (64'o) of negative optical power, a lens 65o (65'o) of positive optical power and a lens 66o (66'o) of variable optical power, similar to the objective of the microscopy system described with reference to FIGS. 4 and 15. The optical power of the lens 66o is variable by means of a controller, not shown in FIG. 19, for changing a focal length of the objective 63o in order to vary a working distance of the stereo-microscopy system 41o, i.e., a distance between an object plane 45o and the objective 63o. FIG. 19 shows two settings of the working distance with object planes $45o_1$ and $45o_2$. However, at a shorter working distance from the object plane $45o_2$, precise stereo images can only be obtained if the optical axes $54o_2$ and $54'o_2$ extend between the objectives 63o and 63'o such that they intersect in the object plane $45o_2$ on the principal axis 42o. In order to provide such a "bent" of the optical axes $54o_2$ and $54'o_2$, the lenses 66o and 66'o of variable optical power are in addition controlled such that they act as an optical wedge, as symbolically represented by the dashed line in FIG. 19.

FIG. 20 shows a further variant of an afocal zoom system 57p for use in the microscopy system of FIG. 4. The zoom system 57p shown in FIG. 20 comprises two lens assemblies $58p_1$ and $58p_2$ which are disposed spaced apart from one another by a fixed distance along an optical axis 54p of the zoom system 57p. The lens assembly $58p_1$ is disposed close to the objective, not shown in FIG. 20, and the lens assembly $58p_2$ is disposed close to the tube, likewise not shown in FIG. 20. The lens assembly $58p_1$ comprises a lens $71p_1$ of negative optical power which is cemented with a lens $72p_1$ of positive optical power.

Equally, the lens assembly $58p_2$ comprises a lens $71p_2$ of negative optical power which is cemented with lens $72p_2$ of positive optical power. The lens assemblies $58p_1$ and $85p_2$ are of identical structure and mirror-symmetrical in respect of a plane extending orthogonally to the optical axis 54p.

A further lens assembly 97 is disposed between the two lens assemblies $58p_1$ and $58p_2$, said lens assembly comprising two lenses 94 and 96 of positive optical power which are identical in shape and disposed likewise mirror-symmetrical in respect of a plane disposed between the two lenses 94, 96. A lens 95 of negative optical power is interposed in the space between the two lenses 94 and 96 and cemented with the two lenses 94 and 96. The lens assembly 97 is displaceable along the optical axis 54p by means of a drive 99 to change a magnification the zoom system 57e.

In contrast to the zoom system shown in FIG. 4, wherein two out of four lens assemblies are displaceable along the optical axis, only lens assembly 97, out of the four lens assemblies $58p_1$, $58p_2$, 97 of the zoom system 57p according to FIG. 20, is displaceable along the optical axis 54p, and the two other lens assemblies $58p_1$ and $58p_2$ are fixedly disposed on the optical axis. In order to compensate remaining image position defects, the zoom system 57p comprises a lens 73p of variable optical power which, in the embodiment shown in FIG. 20, is disposed close to the lens $71p_1$ at a small distance spaced apart therefrom. Equally, the lens of variable optical power could be disposed on one of the surfaces of the lenses $71p_1$, $72p_1$, $72p_2$ and $71p_2$, or the lens of variable optical power could also be disposed at another position of the beam path of the zoom system 57p.

Figure 20A:
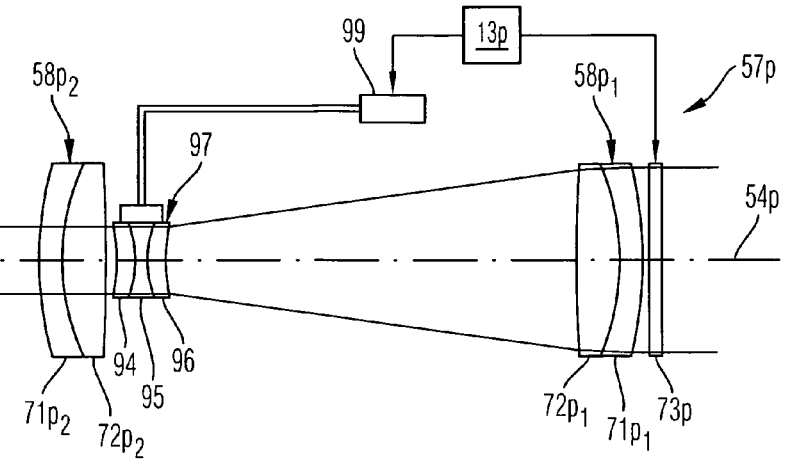
FIG. 20a to FIG. 20c show a further embodiment of a zoom system in different settings.
Figure 20B:
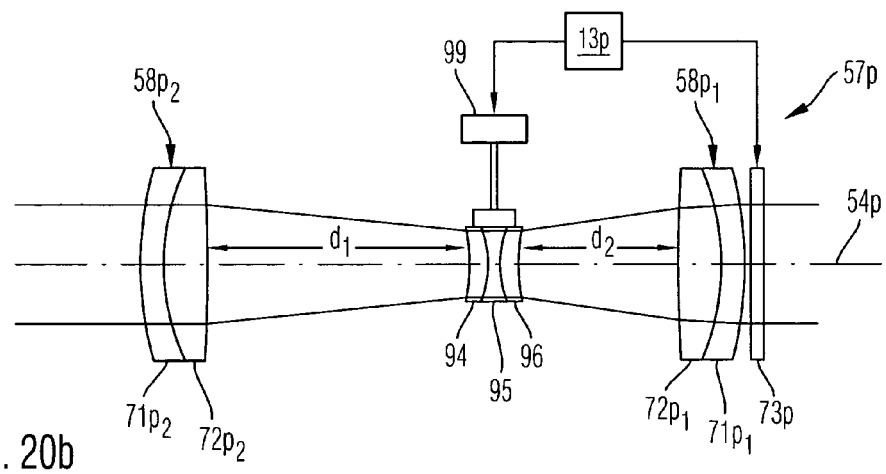
Figure 20C:
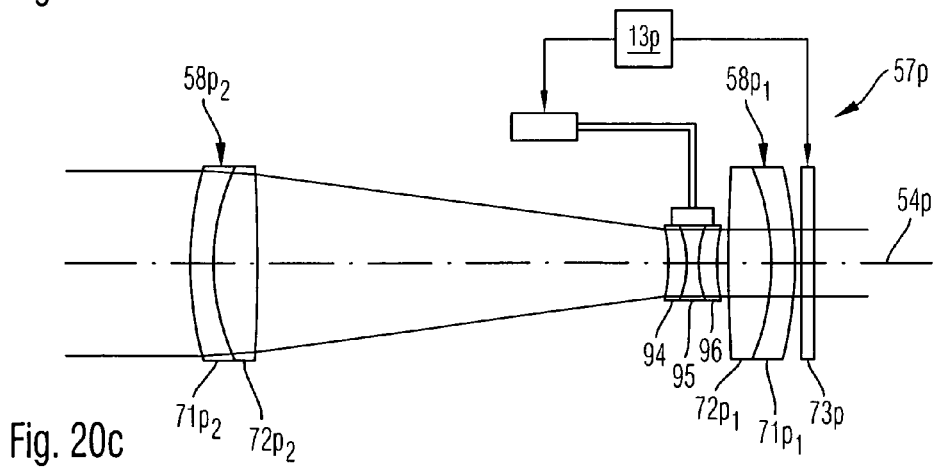

FIGS. 20a, 20b, 20c show three different settings of the zoom system 57p for three different magnifications, the lens 73p of variable optical power being not depicted as layer of constant thickness, but as a corresponding glass lens which provides the corresponding optical power for the respective setting. The lens 73p of variable optical power and the motor 99 for displacing the lens assembly 97 along the optical axis 54p are controlled by a controller 13p which comprises a memory for storing the control values for the lens 73p of variable optical power and the motor 99 for the respective magnification values.

The optical data of lenses $71p_1$, $72p_1$, 96, 95, $72p_2$ regarding materials, radii of curvature and vertex distances are evident from Table 20 below. SF56A, SSK51, SF57, LSFN7, again, refer to glass materials which are obtainable from the company SCHOTT.

TABLE 20

| Lens No. | Surface No. | Radius [mm] | Thickness/ Airgap [mm] | Glass/ Medium | Free diameter [mm] |
|---|---|---|---|---|---|
| | 1 | 31.851 | | | 16.0 |
| 71e1 | | | 1.8 | SF56A | |
| | 2 | 18.701 | | | 16.0 |
| 72e1 | | | 3.4 | SSK51 | |
| | 3 | −325.46 | | | 16.0 |
| | | | 0.8 . . . 32.7 (d2) | | |
| | 4 | −19.527 | | | 6.3 |
| 96 | | | 1.5 | SF57 | |
| | 5 | −8.0006 | | | 6.3 |
| 95 | | | 0.8 | LAFN7 | |
| | 6 | 8.0006 | | | 6.3 |
| 94 | | | 1.5 | SF57 | |
| | 7 | 19.527 | | | 6.3 |
| | | | 32.7 . . . 0.8 (d1) | | |
| | 8 | 325.46 | | | 16.0 |
| 72e2 | | | 3.4 | SSK51 | |
| | 9 | −18.701 | | | 16.0 |
| 71e2 | | | 1.8 | SF56A | |
| | 10 | −31.851 | | | 16.0 |

For the settings shown in FIG. 20a, 20b, 20c, the following Table 21 indicates the values for the magnification provided by the zoom system 57p and the respective optical powers 1/f and distances d between the lenses adjusted in each case.

TABLE 21

| Setting | d1 [mm] | d2 [mm] | Magnification | 1/f [dptr] e lens |
|---|---|---|---|---|
| 1 (FIG. 9a) | 0.8 | 32.7 | 2.4 | 0 |
| 2 (FIG. 9b) | 19.3 | 14.2 | 1.0 | 4.6 |
| 3 (FIG. 9c) | 32.7 | 0.8 | 0.4 | 0 |

In contrast to the conventional zoom systems including two displacable lens assemblies, the zoom system 57p shown in FIG. 20 is advantageous in so far as it exhibits a short overall length. Moreover, in order to change the magnification, only one lens assembly need to be displaced along the optical axis. Therefore, a complex cam control for displacing lens assemblies, as used in conventional systems, can be dispensed with. This entails a considerable simplification of the mechanics as well as of the adjustment required due to unavoidable mechanical and optical tolerances of the zoom system. For example, the necessary mechanic image position adjustment can simply be completely replaced by correspondingly controlling the linear drive.

In summary, objectives are proposed which comprise adjustable optical elements and, if desired, lenses of fixed focal length. By appropriately controlling the adjustable optical elements, the characteristics of the optics can thus be advantageously varied. To this end, systems are provided which are suitable for use as surgical stereo-microscope, objective, ocular and zoom, respectively.

A zoomable imaging optics according to the invention comprises lenses of variable optical power which, in order to change a magnification, can be oppositely controlled in the sense that the optical power of one lens is increased and the optical power of the other lens is decreased. In addition, the imaging optics may include further assemblies of fixed focal length.

While the invention has been described with respect to certain exemplary embodiments thereof, it is evident that many alternatives, modifications and variations will be apparent to those skilled in the art. Accordingly, the exemplary embodiments of the invention set forth herein are intended to be illustrative and not limiting in any way. Various changes may be made without departing from the spirit and scope of the present invention as defined in the following claims.

What is claimed is:

1. A zoomable imaging optics, comprising:
   a first lens of variable optical power;
      a second lens of variable optical power, wherein a common optical axis is assignable to each of the first and second lenses; and
      a controller adapted to
      control the first lens in order to increase the optical power provided by same, and to
      control the second lens in order to decrease the optical power provided by same,
   or to
      control the first lens in order to decrease the optical power provided by same, and
      to control the second lens in order to increase the optical power provided by same,
         for changing an imaging ratio of the zoomable imaging optics,
      wherein the variable optical power of the first lens has a sign different from a sign of the variable optical power of the second lens.

2. The zoomable imaging optics according to claim 1, wherein a space along the common optical axis between the first and the second lens of variable optical power is free of further lenses of fixed optical power.

3. The zoomable imaging optics according to claim 1, further comprising at least one lens assembly of at least one lens of fixed optical power, having an optical axis, which substantially coincides with the common optical axis of the first and second lens of variable optical power.

4. The zoomable imaging optics according to claim 3, wherein a first lens assembly with at least one lens of fixed optical power, the first lens of variable optical power, the second lens of variable optical power and a second lens assembly with at least one lens of fixed optical power are arranged along the common optical axis in this order.

5. The zoomable imaging optics according to claim 3, wherein the first lens of variable optical power, a first lens assembly with at least one lens of fixed optical power, a second lens assembly with at least one lens of fixed optical power and the second lens of variable optical power are arranged along the common optical axis in this order.

6. The zoomable imaging optics according to claim 1, wherein at least one of the first lens and the second lens comprises at least two partial lenses of variable optical power and variable dispersion, arranged in succession in the beam path, and wherein the controller is adapted to control the partial lenses of the at least one of the first and second lens in counter direction.

7. The zoomable imaging optics according to claim 6, wherein the partial lenses each comprise an interface between two liquid media, and wherein the controller is adapted to control the partial lenses such that intersection points of the optical axis with the interfaces of the partial lenses of the first or second lens, respectively, are displaced in the same direction.

8. The imaging optics according to claim 1,
   wherein at least one of the first and second lenses of variable optical power comprises at least two partial lenses,
   wherein the at least two partial lenses are adapted to commonly provide an adjustable total refractive power different from zero, and
   wherein the at least one lens of variable optical power comprises at least two different media each having at least one flexible surface, wherein the change in optical power is caused by a change in the shape of the at least one flexible surface.

9. The imaging optics according to claim 8, wherein the lenses of variable optical power are arranged in direct succession to one another in the beam path.

10. The imaging optics according to claim 9, wherein the lenses of variable optical power arranged in direct succession to one another in the beam path comprise three different media with two flexible interfaces inbetween.

11. The imaging optics according to claim 8, wherein the lenses of variable optical power are arranged in the beam path at a fixed distance, wherein their optical powers are particularly variable such that the sum of their reciprocal values is substantially equal to the fixed distance, so that the total optical power is adjustable to substantially zero.

12. The imaging optics according to claim 11, wherein the spaced-apart lenses each comprise at least two media with at least one flexible surface each, and wherein at least one of the media of one of the spaced-apart lenses is different from the at least two media of the other of one the spaced-apart lenses.

13. The zoomable imaging optics according to claim 1, further comprising a first partial imaging optics with at least one lens of fixed optical power and with an optical axis, and a second partial imaging optics with at least one lens of fixed optical power and with an optical axis, wherein the first and second partial imaging optics are displaceable such that, selectively, the optical axis of the first partial imaging optics or the optical axis of the second partial imaging optics substantially coincides with the common optical axis of the first and second lenses of variable optical power.

14. The zoomable imaging optics according to claim 13, wherein a first imaging ratio of the zoomable imaging optics at a setting of the optical powers of the first and second lenses of variable optical power and at an arrangement of the optical axis of the first partial imaging optics on the common optical axis, is different from a second imaging ratio of the zoomable imaging optics at the setting of the optical powers of the first and second lenses of variable optical power and at an arrangement of the optical axis of the second partial imaging optics on the common optical axis.

15. The zoomable imaging optics according to claim 14, wherein $$2\frac{|M_1 - M_2|}{(M_1 + M_2)} > 0,3, \text{ wherein}$$

$M_1$ is the first imaging ratio and
$M_2$ is the second imaging ratio.

16. The zoomable imaging optics according to claim 14, wherein the first and second partial imaging optics each comprise a telescope arrangement.

17. The zoomable imaging optics according to claim 1, further comprising at least one mirror surface arranged along the common optical axis between the first lens of variable optical power and the second lens of variable optical power, for folding a beam path of the imaging optics.

18. The zoomable imaging optics according to claim 1, having at least one lens of variable optical power, wherein:

$$D < \Delta f \cdot k$$

wherein

D is an effective diameter of the lens of variable optical power,

Δf represents a maximum change of a focal length of the lens of variable optical power, and k is a constant within the range of about 0.9 to about 1.2.

19. A stereo-microscopy system for generating a magnified stereoscopic image of an object in combination with the optics according to claim 1, comprising:

an objective for transforming an object-side beam bundle, emanating from an object plane of the objective, into an image-side beam bundle;

a left-hand partial stereo optics, to which light of a left-hand partial beam bundle is supplied, for generating a left-hand partial image of the stereoscopic image; and a right-hand partial stereo optics, to which light of a right-hand partial beam bundle is supplied, for generating a right-hand partial image of the stereoscopic image, wherein a working distance between the object plane and a lens of the objective positioned closest to the object plane is variable at least within a range of 275 mm to 325 mm, and wherein a difference between the working distance and a focal length of the objective is smaller than 50 mm at every setting of the working distance.

20. A stereo-microscopy system for generating a magnified stereoscopic image of an object in combination with the optics according to claim 1, comprising:

an objective for transforming an object-side beam bundle, emanating from an object plane of the objective, into an image-side beam bundle;

a left-hand partial stereo optics, to which light of a left-hand partial beam bundle is supplied, for generating a left-hand partial image of the stereoscopic image; and a right-hand partial stereo optics, to which light of a right-hand partial beam bundle is supplied, for generating a right-hand partial image of the stereoscopic image, wherein the left-hand and right-hand partial stereo optics each include a zoom optics, wherein each of the two zoom optics comprises two spaced apart lens assemblies, wherein each of the two lens assemblies comprises a first lens of positive optical power made of a material having a first index of refraction, and a second lens of negative optical power made of a material having a second index of refraction different from the first index of refraction, wherein the first lens and the second lens are cemented together, and wherein the lens assembly further includes at least one third lens of a variable optical power positioned at a fixed distance from the first lens, and the two zoom optics further include a controller for adjusting the optical power of the third lens for changing a magnification respectively provided by the two zoom optics.

21. A stereo-microscopy system for generating a magnified stereoscopic image of an object in combination with the optics according to claim 1, said stereo-microscopy system comprising:

an objective for transforming an object-side beam bundle, emanating from an object plane of the objective, into an image-side beam bundle;

a left-hand partial stereo optics, to which light of a left-hand partial beam bundle is supplied, for generating a left-hand partial image of the stereoscopic image; and a right-hand partial stereo optics, to which light of a right-hand partial beam bundle is supplied, for generating a right-hand partial image of the stereoscopic image, wherein the left-hand and right-hand partial stereo optics each include a zoom optics, wherein each of the two zoom optics comprises a first, a second and a third lens assembly, wherein the first and the second lens assemblies are arranged fixedly with respect to one another along an optical axis of the first, second and third lens assemblies, and the third lens assembly is movable along the optical axis relative to the first and second lens assemblies, and wherein the zoom optics further comprises a lens of variable optical power and a controller adapted to change the optical power of the lens of variable optical power in dependence of a position of the third lens assembly along the optical axis.

22. A stereo-microscopy system for generating a magnified stereoscopic image of an object in combination with the optics according to claim 1, said stereo-microscopy system comprising:

an objective for transforming an object-side beam bundle, emanating from an object plane of the objective, into an image-side beam bundle;

a left-hand partial stereo optics, to which light of a left-hand partial beam bundle is supplied, for generating a left-hand partial image of the stereoscopic image; and a right-hand partial stereo optics, to which light of a right-hand partial beam bundle is supplied, for generating a right-hand partial image of the stereoscopic image, wherein the left-hand and right-hand partial stereo optics each include an ocular, wherein each of the two oculars comprises a lens assembly comprising a first lens of positive optical power made of a material having a first index of refraction, and a second lens of negative optical power made of a material having a second index of refraction different from the first index of refraction, wherein the first lens and the second lens are cemented together, and wherein the lens assembly further includes at least one third lens of variable optical power positioned at a fixed distance from the first lens, the two oculars comprising a controller for adjusting the optical power of the third lens in order to provide an additional optical power for each of the two oculars for compensating vision defects of the eyes of an observer.

23. A stereo-microscopy system for generating a magnified stereoscopic image of an object in combination with the optics of claims 1, comprising:

a left-hand partial stereo optics with a left-hand objective assembly, which receives light of a left-hand object-side beam bundle emanating from an object plane of the left-hand objective assembly, for generating a left-hand partial image of the stereoscopic image;

a right-hand partial stereo optics with a right-hand objective assembly, which receives light of a right-hand object-side beam bundle emanating from an object plane of the right-hand objective assembly, for generating a right-hand partial image of the stereoscopic image, wherein distances of the left-hand and right-hand objective assemblies to their object planes are respectively adjustable, and wherein at least one of the two objective assemblies further comprises at least one prism of an adjustable prism power, and wherein the two objective assemblies further comprise a controller for adjusting the prism power of the at least one prism in dependence of the adjusted distances.

24. The stereo-microscopy system according to claim 23, wherein the prism with variable prism power comprises at least one liquid crystal layer, the optical path length of which is spatially dependently adjustable.

25. The zoomable imaging optics according to claim 1, wherein the first lens and the second lens are spaced apart, and wherein an air gap is present in the space between the first lens and the second lens.

26. The zoomable imaging optics according to claim 1, wherein at least one of the first lens and the second lens comprises at least two partial lenses made of different liquid media, and an interface between the two liquid media, wherein the liquid media are arranged in succession along the common optical axis, and wherein the at least two partial lenses are of variable optical power and variable dispersion.

27. The zoomable imaging optics according to claim 26, wherein the controller is adapted to control the partial lenses such that intersection points of the common optical axis with the interfaces of the partial lenses of the first or second lens, respectively, are displaced in the same direction.

28. An image optics according to claim 1, wherein the first and second lens each comprises at least two different media each having at least one flexible surface, wherein the change in optical power is caused by a change in the shape of the at least one flexible surface.

29. The zoomable imaging optics according to claim 1, wherein at least one of the first lens and the second lens comprises a liquid.

30. The zoomable imaging optics according to claim 1, wherein at least one of the first lens and the second lens comprises a liquid crystal.

31. A zoomable imaging optics, comprising:
   a first lens of variable optical power;
      a second lens of variable optical power, wherein a common optical axis is assignable to each of the first and second lenses; and
      a controller adapted to
      control the first lens in order to increase the optical power provided by same, and to
      control the second lens in order to decrease the optical power provided by same,
   or to
      control the first lens in order to decrease the optical power provided by same, and
      to control the second lens in order to increase the optical power provided by same,
for changing an imaging ratio of the zoomable imaging optics,
   wherein the first lens and the second lens each provide a variable dispersion, and wherein a ratio of the dispersion of the first lens, $\eta_1$, to the dispersion of the second lens, $\eta_2$, fulfils the following condition:

$$\Gamma_{min}/\Gamma_{max} \leq \eta_1/\eta_2 \leq \Gamma_{max}/\Gamma_{min}, \text{ wherein}$$

$\Gamma_{min}$ is a minimum absolute value and
$\Gamma_{max}$ is a maximum absolute value of an imaging ratio of the imaging optics.

32. The zoomable imaging optics according to claim 31, wherein the ratio of the dispersions of the first and second lenses fulfils the following condition:

$$\Gamma_{min}/\Gamma_0 \leq \eta_1/\eta_2(\Gamma_{min}) \leq \Gamma_0/\Gamma_{min}, \text{ wherein}$$

$\Gamma_0$ is a basic imaging ratio of the imaging optics, at which the first and second lenses do not provide an optical power and a dispersion, and
$\eta_1/\eta_2 (\Gamma_{min})$ is a ratio of the dispersions of the first and second lenses obtained at the minimum absolute value of the imaging ratio.

33. The zoomable imaging optics according to claim 32, wherein the ratio of the dispersions of the first and second lenses is equal to, or particularly smaller than one.

34. The zoomable imaging optics according to claim 31, wherein the ratio of the dispersions of the first and second lenses fulfils the following condition:

$$\Gamma_{max}/\Gamma_0 \leq \eta_1/\eta_2(\Gamma_{max}) \leq \Gamma_0/\Gamma_{max}, \text{ wherein}$$

$\Gamma_0$ is a basic imaging ratio of the imaging optics, at which the first and second lenses do not provide an optical power and a dispersion, and
$\eta_1/\eta_2 (\Gamma_{max})$ is a ratio of the dispersions of the first and second lenses obtained at the maximum absolute value of the imaging ratio.

35. The zoomable imaging optics according to claim 34, wherein the ratio of the dispersions of the first and second lenses is equal to, or particularly larger than one.

36. The zoomable imaging optics according to claim 31, further comprising at least one lens assembly of at least one lens of fixed optical power, having an optical axis, which substantially coincides with the common optical axis of the first and second lens of variable optical power, wherein the lens assembly with the at least one lens of fixed optical power provides a fixed dispersion, and wherein the variable dispersion of the first and second lens substantially compensates the fixed dispersion for at least one imaging ratio.

37. The zoomable imaging optics according to claim 36, wherein the variable dispersion of the first and second lens substantially compensates the fixed dispersion for two different imaging ratios, but does not substantially compensate the fixed dispersion for an in-between range of the imaging ratio.

38. The zoomable imaging optics according to claim 31, wherein at least one of the first lens and the second lens comprises two partial lenses made of different liquid media, and an interface between the two liquid media, wherein the liquid media are arranged in succession along the common optical axis, and wherein the two partial lenses are of variable optical power and variable dispersion.

39. A zoomable imaging optics, comprising:
   a first lens of variable optical power;
      a second lens of variable optical power, wherein a common optical axis is assignable to each of the first and second lenses; and
      a controller adapted to
      control the first lens in order to increase the optical power provided by same, and to
      control the second lens in order to decrease the optical power provided by same,
   or to
      control the first lens in order to decrease the optical power provided by same, and
      to control the second lens in order to increase the optical power provided by same,
for changing an imaging ratio of the zoomable imaging optics,
   wherein the first lens and the second lens each provide a dispersion variable with the optical power, and wherein the variable dispersions of the first and second lens and the controlling of the first and second lens are adjusted to one another such that the following condition is fulfilled:

$$|\eta_1 + \eta_2| < \text{Min}(|\eta_1|; |\eta_2|), \text{ wherein}$$

$\text{Min}(|\eta_1|; |\eta_2|)$ is the smaller of the two dispersion amounts.

40. The zoomable imaging optics according to claim 39, wherein the first lens and the second lens are arranged in direct succession to one another in the beam path, and wherein the ratio of the dispersion $\eta_1$ of the lens with the absolutely larger optical power, $\phi_1$, to the dispersion $\eta_2$ of the lens with the absolutely smaller optical power, $\phi_2$, fulfills the following condition:

$$1 \leq -(\eta_1/\eta_2) \leq |\phi_1/\phi_2|.$$

41. The zoomable imaging optics according to claim 39, wherein the first lens and the second lens are separated in the beam path by a distance which is substantially equal to the sum of the reciprocal values of the optical powers of the first and second lenses, and wherein the ratio of the dispersion $\eta_1$ of the lens with the absolutely larger optical power, $\phi_1$, to the dispersion $\eta_2$ of the lens with the absolutely smaller optical power, $\phi_2$, fulfills the following condition:

$$|\phi_1/\phi_2| \leq -(\eta_1/\eta_2) \leq (\phi_1/\phi_2)^2.$$

42. The zoomable imaging optics according to claim 39, wherein at least one of the first lens and the second lens comprises two partial lenses made of different liquid media, and an interface between the two liquid media, wherein the liquid media are arranged in succession along the common optical axis, and wherein the two partial lenses are of variable optical power and variable dispersion.

43. A zoomable imaging optics, comprising:
a first lens of variable optical power;
a second lens of variable optical power, wherein a common optical axis is assignable to each of the first and second lenses; and
a controller adapted to
control the first lens in order to increase the optical power provided by same, and to
control the second lens in order to decrease the optical power provided by same,
or to
control the first lens in order to decrease the optical power provided by same, and
to control the second lens in order to increase the optical power provided by same,
for changing an imaging ratio of the zoomable imaging optics,
wherein the first lens and the second lens each provide a dispersion variable with the optical power, and wherein a ratio of the dispersion $\eta_1$ of the lens with the absolutely larger optical power, $\phi_1$, to the dispersion $\eta_2$ of the lens with the absolutely smaller optical power, $\phi_2$, fulfills the following condition:

$$1 \leq -(\eta_1/\eta_2) \leq (\phi_1/\phi_2)^2, \text{ wherein}$$

$\phi_1$ is the absolutely larger optical power, and
$\phi_2$ is the absolutely smaller optical power.

44. The zoomable imaging optics according to claim 43, wherein at least one of the first lens and the second lens comprises two partial lenses made of different liquid media, and an interface between the two liquid media, wherein the liquid media are arranged in succession along the common optical axis, and wherein the two partial lenses are of variable optical power and variable dispersion.

45. An imaging optics having at least two lenses of variable optical power, the two lenses being adapted to commonly provide an adjustable total optical power, characterized in that the lenses of variable optical power each comprise at least two different media each having at least one flexible surface, wherein the change in optical power is caused by a change in the shape of the at least one flexible surface,
wherein the lenses of variable optical power each have a dispersion variable in dependence of their optical power, and wherein the media are so selected that the total dispersion is substantially zero at at least one total optical power different from zero.

46. An imaging optics having at least two lenses of variable optical power, the two lenses being adapted to commonly provide an adjustable total optical power, characterized in that the lenses of variable optical power each comprise at least two different media each having at least one flexible surface, wherein the change in optical power is caused by a change in the shape of the at least one flexible surface,
wherein the lenses of variable optical power are arranged in the beam path at a fixed distance, wherein their optical powers are particularly variable such that the sum of their reciprocal values is substantially equal to the fixed distance, so that the total optical power is adjustable to substantially zero, and
wherein the lenses of variable optical power are adapted to commonly provide an adjustable imaging ratio, wherein the lenses of variable optical power each provide a dispersion in dependence of their optical power, and wherein the media are so selected that the total dispersion is substantially zero at at least one total imaging ratio different from 1 and from −1.

47. A zoomable imaging optics, comprising:
a first lens of variable optical power;
a second lens of variable optical power, wherein a common optical axis is assignable to each of the first and second lenses; and
a controller adapted to
control the first lens in order to increase the optical power provided by same, and to
control the second lens in order to decrease the optical power provided by same,
or to
control the first lens in order to decrease the optical power provided by same, and
to control the second lens in order to increase the optical power provided by same,
for changing an imaging ratio of the zoomable imaging optics,
wherein the variable optical power of the first lens has a sign different from a sign of the variable optical power of the second lens, and
wherein at least one of the first lens and the second lens has variable optical power, wherein:

$$D < \Delta f \cdot k$$

wherein
D is an effective diameter of the lens of variable optical power,
$\Delta s$ represents a maximum change of a focal length of the lens of variable optical power, and
k is a constant within the range of about 0.9 to about 1.2.

48. A method of changing an imaging ratio of an imaging optics, comprising:
increasing an optical power of a first lens of variable optical power, which is arranged in an imaging beam path of the imaging optics; and
decreasing an optical power of a second lens of variable optical power, which is arranged in an imaging beam path of the imaging optics spaced apart from the first lens of variable optical power;
wherein the first lens and the second lens being adapted to commonly provide an adjustable total refractive power different from zero, characterized in that the lenses of variable optical power each comprise at least two different media each having at least one flexible surface, wherein the change in optical power is caused by a change in the shape of the at least one flexible surface.

49. A stereo-microscopy system for generating a magnified stereoscopic image of an object in combination with a zoomable image optics, wherein the zoomable imaging optics comprises a first lens of variable optical power, a second lens of variable optical power, wherein a common optical axis is assignable to each of the first and second lenses, and a controller adapted to control the first lens in order to increase the optical power provided by same, and to control the second lens in order to decrease the optical power provided by same, or to control the first lens in order to decrease the optical power provided by same, and to control the second lens in order to increase the optical power provided by same, for changing an imaging ratio of the zoomable imaging optics, and wherein the variable optical power of the first lens has a sign different from a sign of the variable optical power of the second lens, and said stereo-microscopy system comprising:

an objective for transforming an object-side beam bundle, emanating from an object plane of the objective, into an image-side beam bundle;

a left-hand partial stereo optics, to which light of a left-hand partial beam bundle is supplied, for generating a left-hand partial image of the stereoscopic image; and a right-hand partial stereo optics, to which light of a right-hand partial beam bundle is supplied, for generating a right-hand partial image of the stereoscopic image, wherein the objective includes a lens assembly which comprises a first lens of positive power as the first lens of variable optical power through which the left-hand and the right-hand partial beam bundles pass, and wherein the lens assembly further comprises an optical assembly though which the left-hand and the right-hand partial beam bundles pass, wherein the optical assembly provides spatially dependent optical path lengths for light beams passing through the optical assembly, and wherein the objective comprises a controller for adjusting the spatially dependent optical path lengths such that with respect to a fast principal axis of the left-hand partial beam bundle at least a round lens action is provided, and such that with respect to a second principal axis of the right-hand partial beam bundle spaced apart from the first principal axis at least a round lens action is provided.

50. The stereo-microscopy system according to claim 49, wherein the left-hand and the right-hand partial stereo optics are displaceable in circumferential direction around a principal axis of the objective.

51. The stereo-microscopy system according to claim 49, wherein a magnification of the left-hand and the right-hand partial image is adjustable and the controller is adapted to set magnitudes of the round lens powers for the left-hand and the right-hand partial beam bundles in dependence of a set magnification.

52. The stereo-microscopy system according to claim 49, wherein the optical assembly comprises at least one liquid crystal layer, the optical path length of which is spatially dependently adjustable.

* * * * *

UNITED STATES PATENT AND TRADEMARK OFFICE
CERTIFICATE OF CORRECTION

PATENT NO. : 7,411,739 B2 Page 1 of 1
APPLICATION NO. : 11/408633
DATED : August 12, 2008
INVENTOR(S) : Andreas Obrebski et al.

It is certified that error appears in the above-identified patent and that said Letters Patent is hereby corrected as shown below:

In Claim 7, column 30, line 1, the word "tenses" should be --lenses--.

In Claim 47, column 36, line 51, "$\Delta$ s" should be --$\Delta$ f--.

In Claim 49, column 38, line 5, the word "though" should be --through--.

In Claim 49, column 38, line 11, the word "fast" should be --first--.

Signed and Sealed this

Third Day of March, 2009

JOHN DOLL
*Acting Director of the United States Patent and Trademark Office*